Feb. 22, 1966 R. K. BOOHER 3,237,000

MULTIPLICATION APPARATUS

Filed Oct. 23, 1961 12 Sheets-Sheet 1

INVENTOR.
ROBERT K. BOOHER

BY *Allan Rothenberg*

ATTORNEY

| Np | No | Nx | MN | | |
|---|---|---|---|---|---|
| 0 | X | X | 0 | TX | |
| X | I | X | 0 | To | |
| X | I | I | I | TI | |
| I | 0 | I | I | T2 | |
| I | I | 0 | 0 | T3 | |
| 0 | 0 | I | I | T4 | |
| I | I | 0 | 0 | T5 | W3 |
| 0 | I | I | I | T6 | |
| I | 0 | I | I | T7 | |
| I | 0 | 0 | 0 | Ts | |
| 0 | X | 0 | 0 | Tp | |
| 0 | X | X | 0 | Tx | |
| X | I | X | 0 | To | |
| S | I | I | I | TI | |
| I | 0 | I | I | T2 | |
| I | I | 0 | 0 | T3 | W4 |
| 0 | 0 | I | I | T4 | |
| I | I | 0 | 0 | T5 | |
| 0 | I | I | I | T6 | |
| I | 0 | I | I | T7 | |
| I | 0 | 0 | 0 | Ts | |
| 0 | X | 0 | 0 | Tp | |
| 0 | X | X | 0 | Tx | |
| 0 | I | X | 0 | To | |

*INVENTOR.*
ROBERT K. BOOHER
*BY*
ATTORNEY

Feb. 22, 1966 R. K. BOOHER 3,237,000

MULTIPLICATION APPARATUS

Filed Oct. 23, 1961 12 Sheets-Sheet 3

INVENTOR.
ROBERT K. BOOHER

BY [signature]

ATTORNEY

Feb. 22, 1966 R. K. BOOHER 3,237,000

MULTIPLICATION APPARATUS

Filed Oct. 23, 1961 12 Sheets-Sheet 4

INVENTOR.
ROBERT K. BOOHER

BY [signature]

ATTORNEY

INVENTOR.
ROBERT K. BOOHER

BY

ATTORNEY

INVENTOR.
ROBERT K. BOOHER
BY
Allan Rothenberg
ATTORNEY

MULTIPLICATION APPARATUS

Filed Oct. 23, 1961 12 Sheets-Sheet 7

*INVENTOR.*
ROBERT K. BOOHER
*BY*
Allen Rothenberg
ATTORNEY

MULTIPLICATION APPARATUS

Filed Oct. 23, 1961 12 Sheets-Sheet 8

INVENTOR.
ROBERT K. BOOHER

BY [signature]

ATTORNEY

Feb. 22, 1966 R. K. BOOHER 3,237,000

MULTIPLICATION APPARATUS

Filed Oct. 23, 1961 12 Sheets-Sheet 9

INVENTOR.
ROBERT K. BOOHER

BY Allan Rothenberg

ATTORNEY

INVENTOR.
ROBERT K. BOOHER
BY

ATTORNEY

| Cr4 | Cr3 | As | A7 | A6 | A5 | A4 | A3 | A2 | A1 | Ao | Ax | Lp | Cr6 | Cr5 | Ls | L7 | L6 | L5 | L4 | L3 | L2 | L1 | Lo | Lx | |
|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | X | X | 0 | 0 | 1 | 1 | 0 | 0 | 0 | 1 | 0 | X | X | X | X | W1 |
| 1 | 0 | 1 | 0 | 0 | 0 | 0 | 0 | 1 | 0 | 0 | X | 0 | 1 | 0 | 0 | 0 | 1 | 0 | 0 | X | X | 0 | 0 | X | W2 |
| 1 | 0 | 1 | 1 | 0 | 1 | 1 | 1 | 1 | 0 | 0 | X | 0 | 0 | 0 | 1 | 0 | 0 | X | X | 0 | 1 | 0 | 0 | X | W3 |
| 0 | 0 | 1 | 1 | 1 | 1 | 0 | 1 | 1 | 0 | 0 | X | 0 | 1 | 0 | 0 | X | X | 0 | 1 | 0 | 1 | 0 | 0 | X | W4 |
| 0 | 0 | 0 | 1 | 0 | 1 | 0 | 1 | 1 | 1 | 0 | X | 0 | 0 | X | X | 0 | 1 | 0 | 1 | 0 | 0 | 0 | 0 | X | W5 |
| | | 0 | 1 | 0 | 1 | 0 | 0 | 0 | 1 | | | | | | 1 | 1 | 1 | 0 | 1 | 1 | 0 | 0 | | | W6 |

INVENTOR.
ROBERT K. BOOHER
BY
Allan Rattenberg
ATTORNEY

| | COL. 1-Cr4 | COL. 2 - Lx | COL. 3-Lp | COL.4-C2 | COL. 5 | COL. 6 | COL. 7 |
|---|---|---|---|---|---|---|---|
| | CARRY Wgt. 2 | BIT Wgt. 1 | LOWER BIT | CARRY Wgt. 1 | NET CARRY Wgt. 1 | ADD SUBT INDICATE | CARRY ON |
| 1 | +1 | 1 | 0 | −1 | +1 | + | To $T_1$ etc |
| 2 | +1 | 1 | 0 | 0 | +2 | + | To $T_1$ etc |
| 3 | +1 | 0 | 1 | + | +3 | + | To $T_1$ etc |
| 4 | +1 | 0 | 1 | 0 | +2 | + | $T_1$ etc |
| 5 | +1 | 0 | 0 | −1 | +1 | | To ONLY |
| 6 | +1 | 0 | 0 | 0 | +2 | + | $T_1$ |
| 7 | 0 | 1 | 1 | +1 | +1 | + | To $T_1$ |
| 8 | 0 | 1 | 1 | 0 | 0 | | OFF |
| 9 | 0 | 1 | 0 | −1 | −1 | | To ONLY |
| 10 | 0 | 1 | 0 | 0 | 0 | | OFF |
| 11 | 0 | 0 | 1 | +1 | +1 | | To ONLY |
| 12 | 0 | 0 | 1 | 0 | 0 | | OFF |
| 13 | 0 | 0 | 0 | −1 | −1 | − | To $T_1$ etc |
| 14 | 0 | 0 | 0 | 0 | 0 | | OFF |
| 15 | −1 | 1 | 1 | +1 | −1 | | To ONLY |
| 16 | −1 | 1 | 1 | 0 | −2 | − | $T_1$ etc |
| 17 | −1 | 1 | 0 | −1 | −3 | − | To $T_1$ etc |
| 18 | −1 | 1 | 0 | 0 | −2 | − | $T_1$ etc |
| 19 | −1 | 0 | 1 | +1 | −1 | − | To $T_1$ etc |
| 20 | −1 | 0 | 1 | 0 | −2 | − | $T_1$ etc |

FIG. 16

*INVENTOR.*
ROBERT K. BOOHER
*BY* Allan Rothenberg
ATTORNEY

United States Patent Office 3,237,000

Patented Feb. 22, 1966

3,237,000

MULTIPLICATION APPARATUS

Robert K. Booher, Downey, Calif., assignor to North American Aviation, Inc.

Filed Oct. 23, 1961, Ser. No. 146,704

16 Claims. (Cl. 235—167)

This invention relates to digital multiplying apparatus and particularly concerns methods and apparatus forming part of a computing system capable of diverse functions, and which can perform multiplication more rapidly and with fewer parts.

A major object of the present invention is to provide a machine capable of performing both multiplication and division with a minimum number of components. Most serial digital computing machines which perform both division and multiplication employ different sets of hardware and completely different logic or interconnection among the hardware components to perform the division and multiplication operations by reason of the fact that the conventional algorithms for division and multiplication are so much different.

The commonly employed algorithm for binary division is that called "non-restoring" or Von Neuman division an example of which is set forth on pages 169 and 170 of "Arithmetic Operations and Digital Computers" by R. K. Richards. Another example of such division is described in U.S. Patent No. 2,701,095 of G. R. Stibitz for "Electronic Computer for Division." In accordance with this commonly followed algorithm, instead of continuously subtracting the divisor until an over-borrow occurs, then adding back the divisor shifting to the right and subtracting again, the division is either added or subtracted to the dividend in accordance with the nature of the previous quotient digit. That is, if the first subtraction does not obtain an over-borrow, a 1 is placed in the particular order of the quotient. This 1 signifies that the next step after shifting the divisor to the right will be a subtraction. If, on the other hand, an over-borrow had occurred, a 0 would have been placed in the quotient whereby such 0 would indicate, after the subsequent right shift, that the next step would be addition. Accordingly, it will be seen that a salient feature of the Von Neuman non-restoring division is that one number, the divisor, is either added to or subtracted from a second number, the dividend, in accordance with the digits, either 1 or 0, of a third number, the quotient. Now it is evident that certain logic will be necessary and has been devised to provide for division in accordance with the salient feature of adding or subtracting according to the digits of the quotient. Consequently if such logic could be utilized in a multiplication process, a machine could be built which could perform both multiplication and division with a simplified set of hardware.

The provision of a machine employing such logic is a major object of this invention. Thus it is an object of this invention to provide a process of multiplication which embodies the steps of adding or subtracting two numbers under the control of indications provided by the digits of a third.

By employing the multiplication concept of the present invention the required logic is itself simplified to provide an advantage independent of its similarity to division logic. A major aspect of the simplified multiplication is that it is necessary to provide only an indication of add or subtract. In conventional multiplication there is required an indication of add or not add. Additionally, where negative numbers are to be handled, provision must be made for a negative multiplier so that there is also required an indication of subtract or not subtract as determined by the multiplier sign bit. The use of simply an indication of add or subtract further simplifies a machine embodying Von Neuman division which also requires the add or subtract indication.

In division we left shift the "reduced dividend" (remainder) whereas in multiplication, if we multiply least significant bit first, we must right shift the partial product. Since we desire to make the multiply operation like the divide operation we would like to left shift the partial product. This dictates that we multiply most significant bit first. Hence, to further pursue the concept of providing a method of multiplication which is similar to common division methods, it is desirable to multiply by adding (or adding and subtracting according to one aspect of the present invention) starting with the most significant digits of the multiplier. Accordingly, another object of this invention, is to provide a method and apparatus for effecting multiplication by selective operations upon highest order digits first.

In order to provide a method and apparatus of multiplication which is most similar in all respects to the commonly employed Von Neuman division, applicant provides a multiplication algorithm by means of which multiplication is provided effectively by performing a computation of the difference between the product of first and second numbers and the product of one of such numbers with the inverse of the second and then subtracting the first number from such difference. These three operations, two multiplications and a subtraction of the products, are performed simultaneously in a serial machine. Particularly, the difference of the two products may be obtained by adding or subtracting the multiplicand to or from successively obtained partial products under the control of an add-subtract indication provided by the particular digits of the multiplier itself. That is, if the multiplier is a 0, subtraction is indicated while if the individual digit of the multiplier under consideration is a 1, addition is indicated. Accordingly, it will be seen that the multiplier in this multiplication algorithm is analogous in its add-subtract indicating function to the quotient in the Von Neuman non-restoring division.

Since it is always desirable to increase the speed of operation of a serial machine, applicant has further provided an improved apparatus which is capable of serial multiplication according to the above-described algorithm but which, at the same time, can perform two of its operations either addition or subtraction in a single word time, where a word time is the time required to perform a full subtraction or a full addition of all digits of the serially-handled numbers.

Accordingly, it is an object of this invention to provide an improved method and apparatus for multiplication which requires less hardware and less time to complete its operation.

Still another object of this invention is to provide a method and apparatus for multiplication which is quite similar to commonly employed division techniques.

Still another object of the invention is to provide a multiplication which embodies both addition and subtraction operations.

A further object of the invention is to provide a multiplication according to division techniques which is achieved two bits at a time.

Still another object of this invention is to provide a method of multiplying starting with digits of highest significance.

These and other objects and many of the attendant advantages of the invention will become more readily apparent in the light of the following detailed description when taken in connection with the accompanying drawings in which:

FIG. 1 comprises a block diagram of registers and timing structure employed in a preferred embodiment of the invention;

Figures 3, 8:
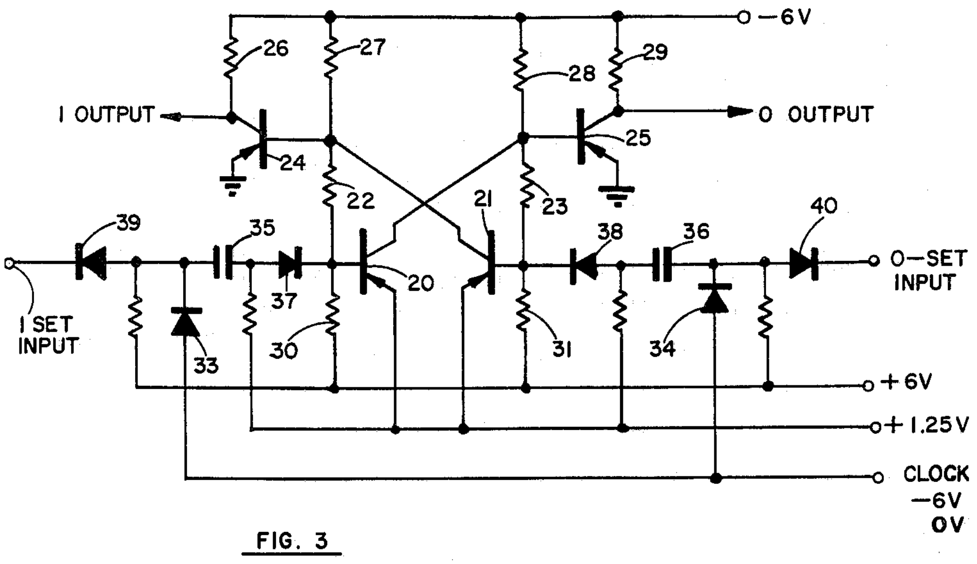
FIG. 3 illustrates details of a typical flip-flop.
Figure 4:
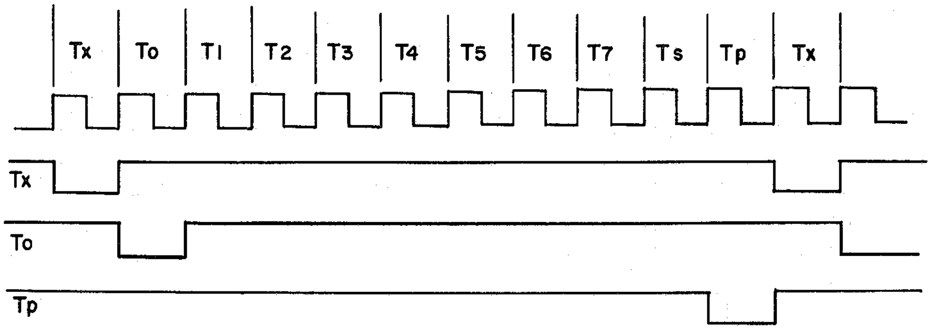
Figure 5:
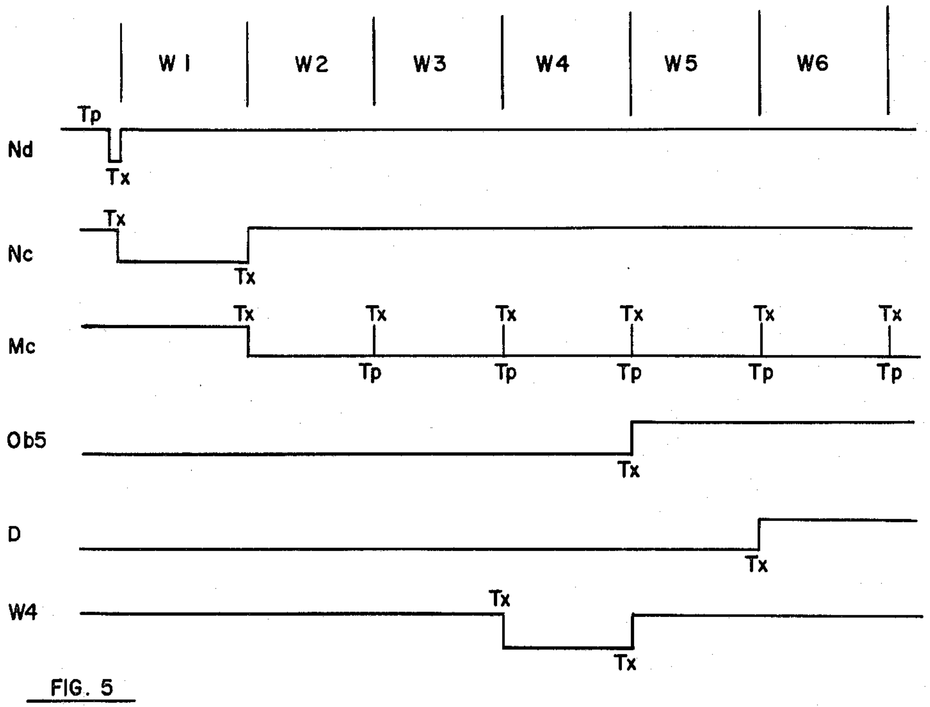
Figure 6:
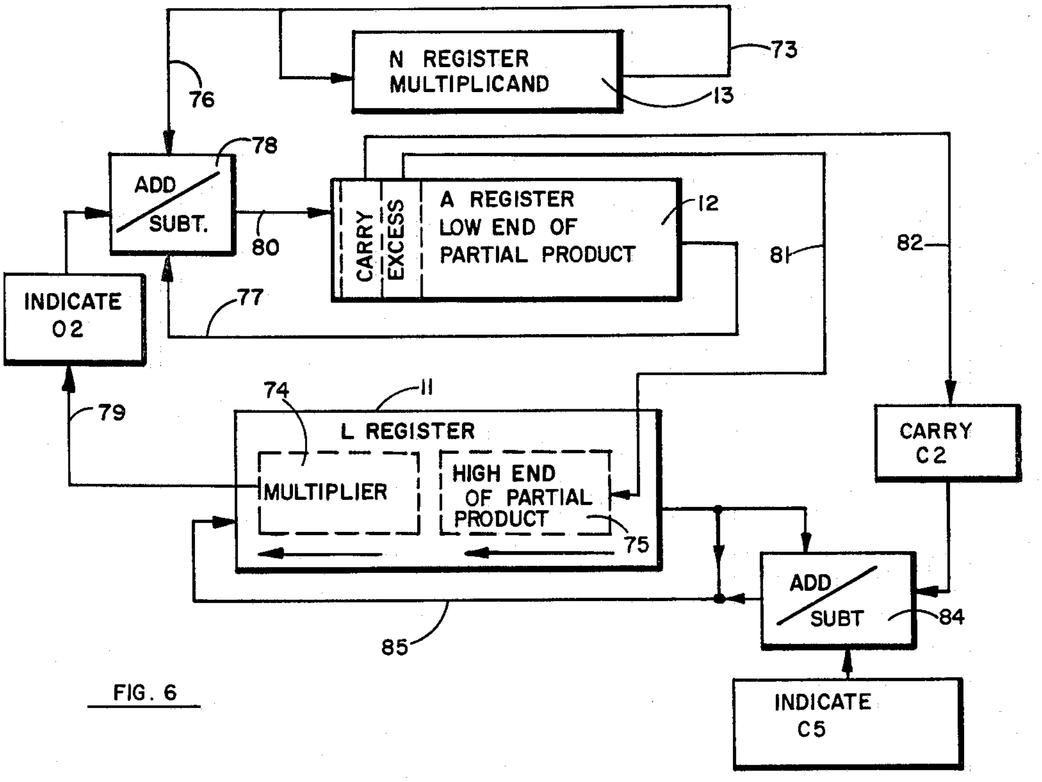
Figure 15:
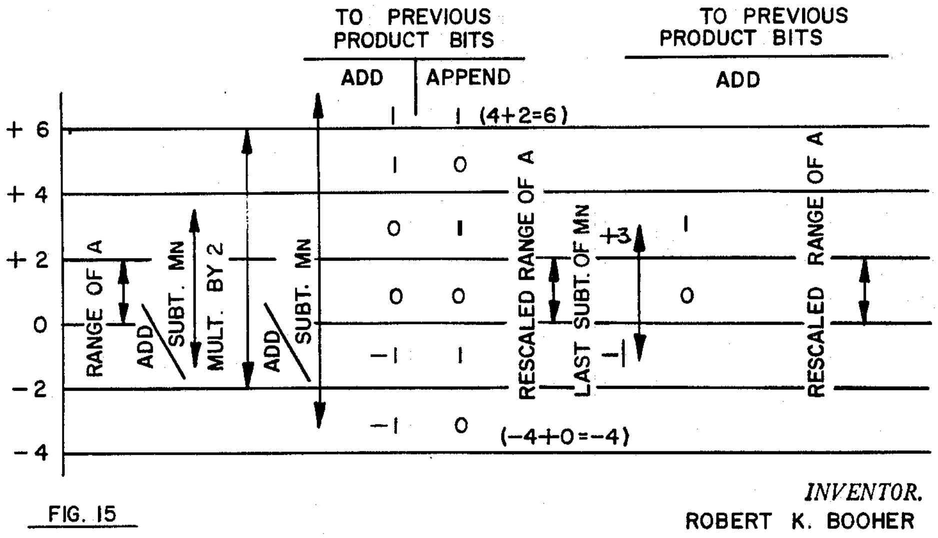
Figure 7:
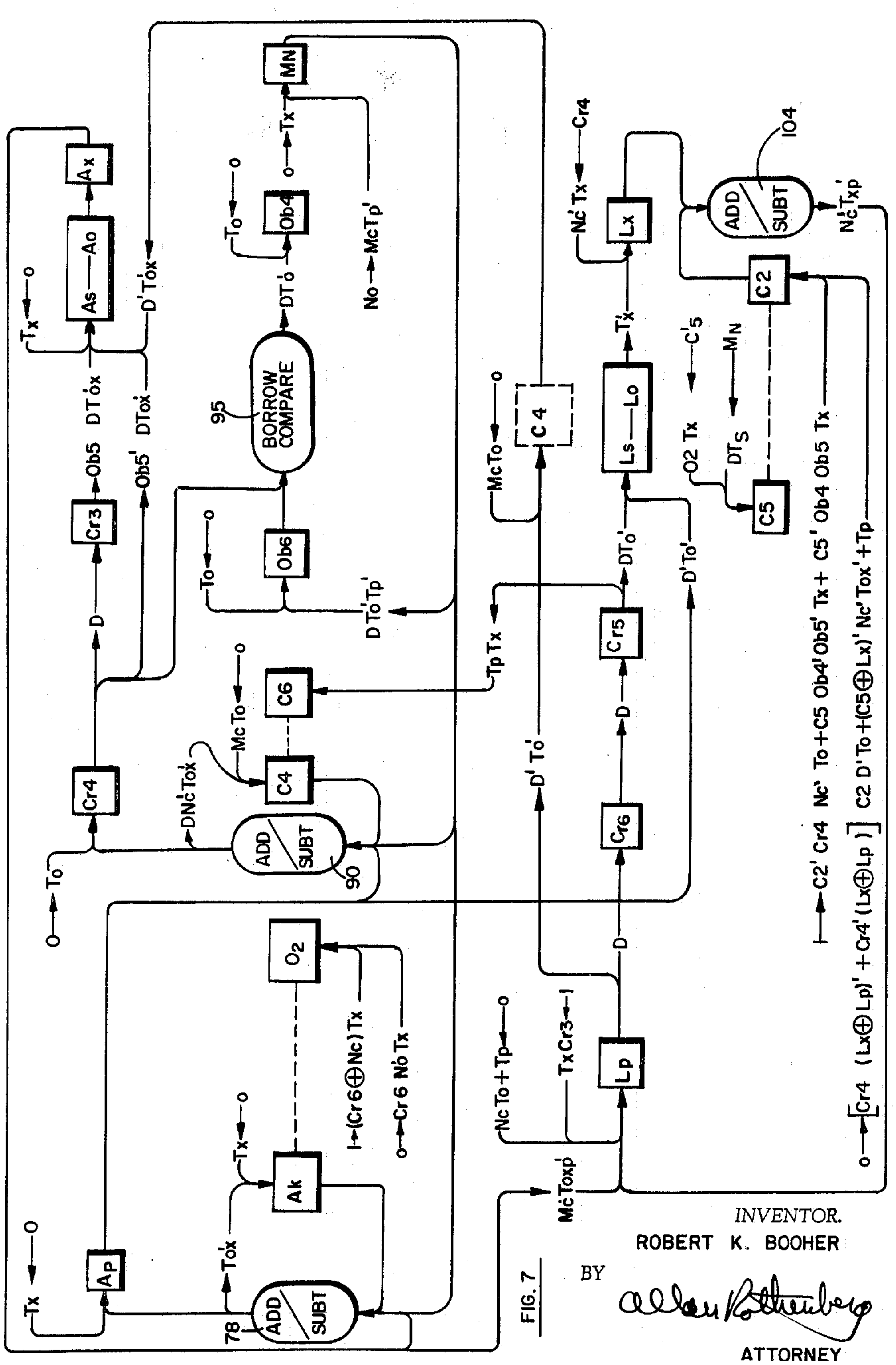
Figure 9:
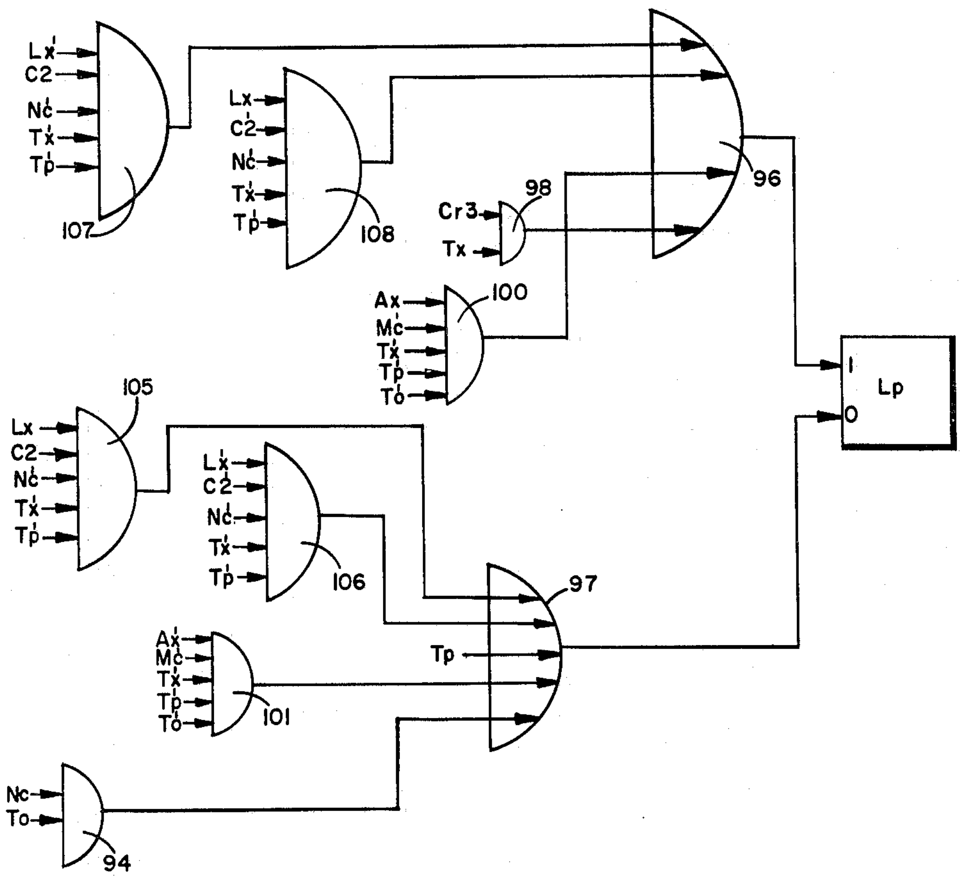
Figure 10:
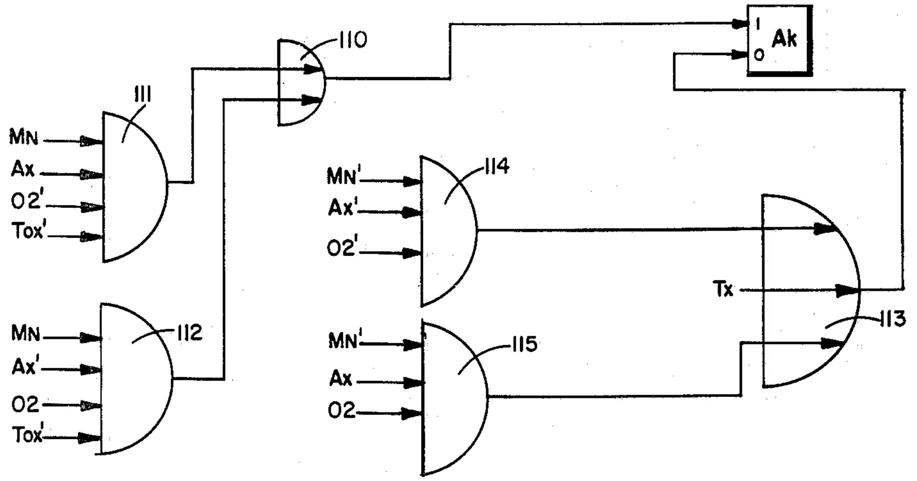
Figure 11:
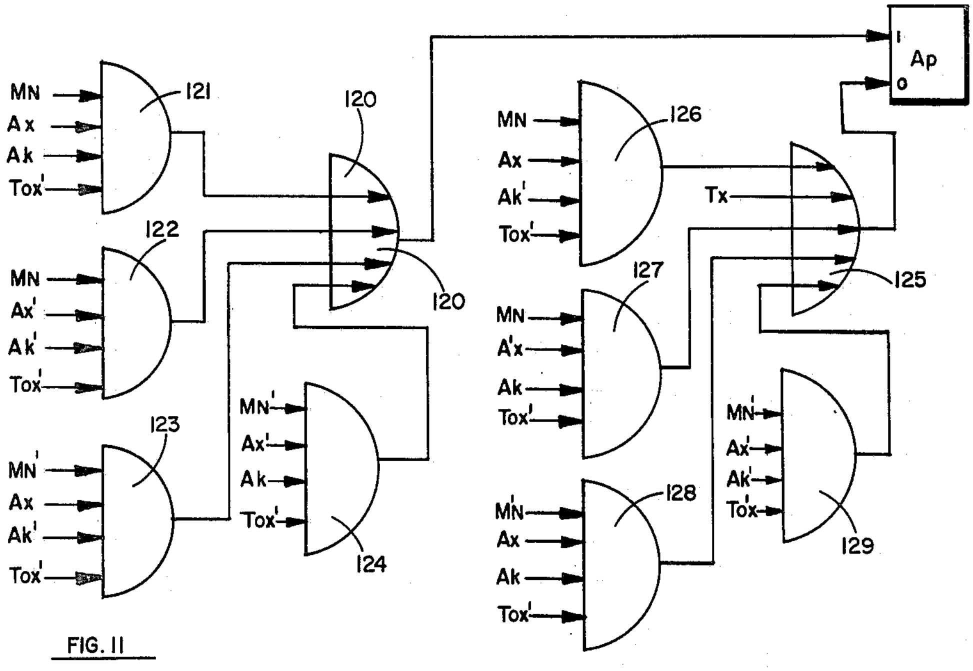
Figure 12A:
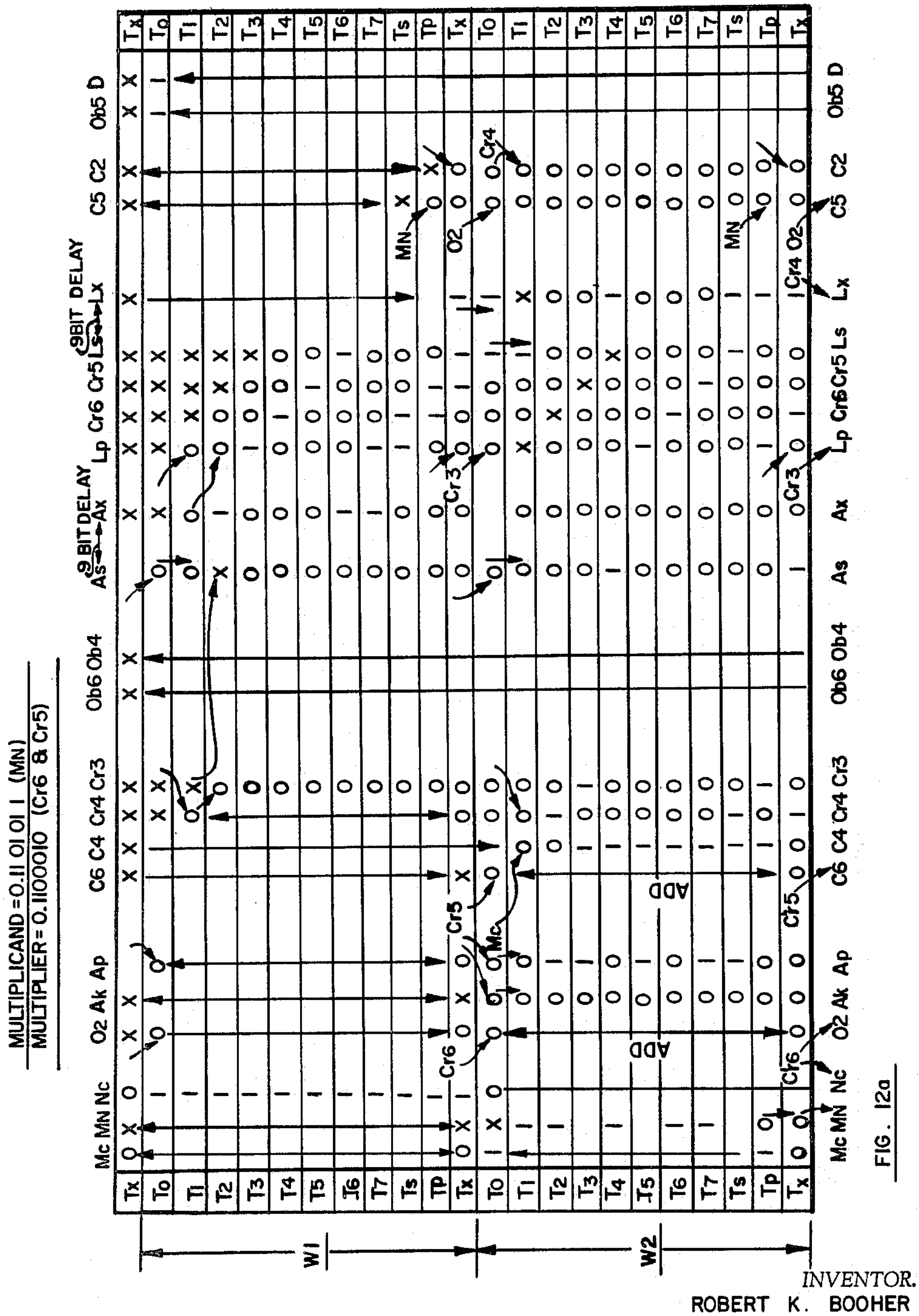
Figure 12B:
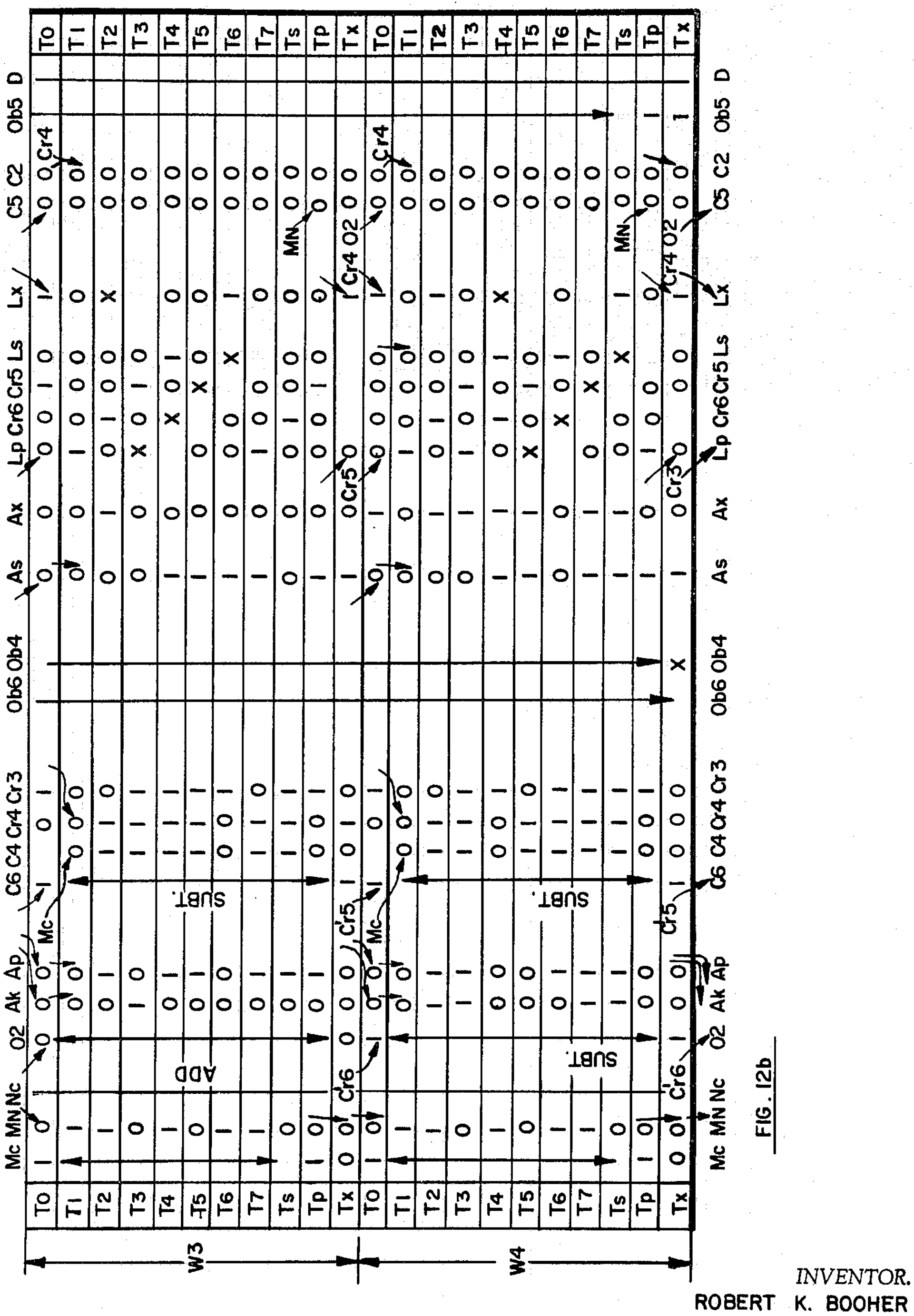
Figure 12C:
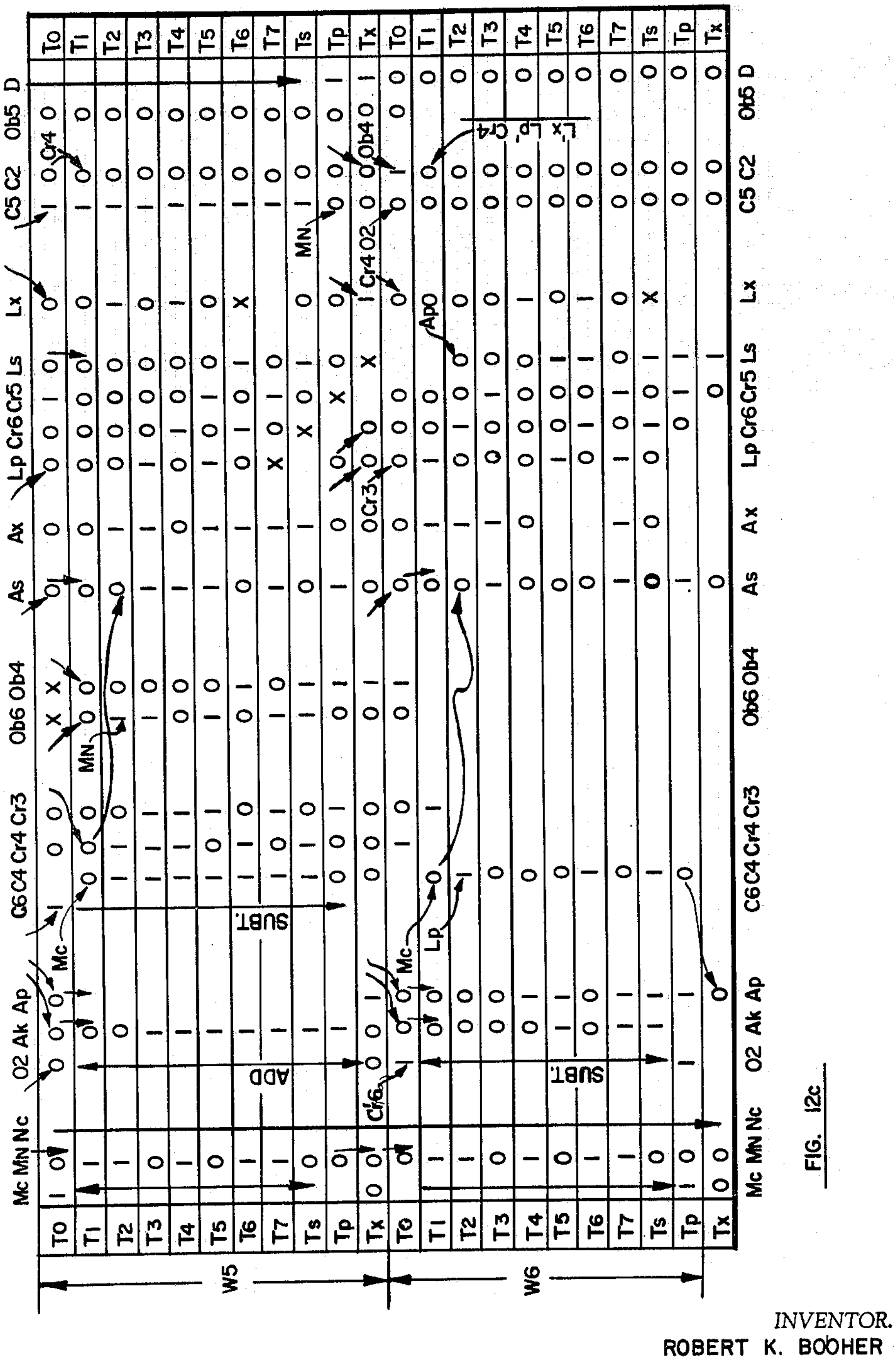
Figures 13, 14:
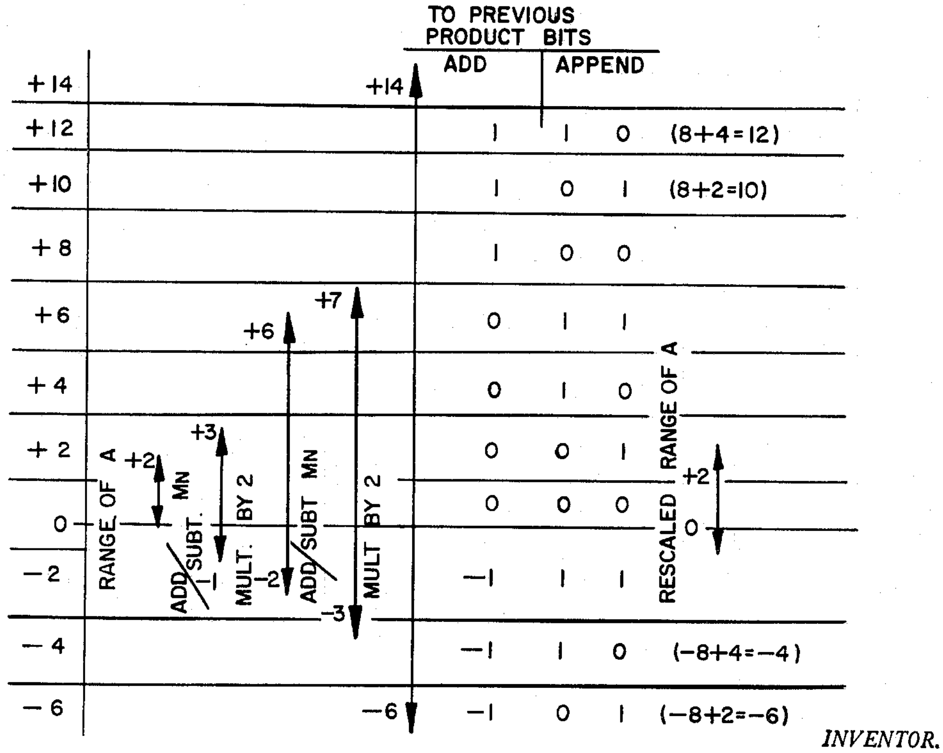

FIGS. 4 and 5 comprise an illustration of certain timing waveforms;

FIG. 6 is a broad functional flow diagram of the described embodiment of the invention;

FIG. 7 is a detailed block diagram of the invention;

FIG. 8 is a chart illustrating operation of the N register;

FIG. 9 illustrates an example of the mechanization of certain logic;

FIGS. 10 and 11 illustrate the mechanization of the add-subtract logic and carry flip-flops therefor;

FIGS. 12*a*, 12*b* and 12*c* together comprise a chart illustrating the bits in several registers and flip-flops during a typical computation;

FIG. 13 comprises an illustration of the contents of certain registers and flip-flops during representative bit times of an exemplary computation;

FIGS. 14 and 15 are charts illustrating scaling and transfer of partial product bits from one register to another, and FIG. 16 is a table related to logic required for the last subtraction compensation.

Throughout the drawings like reference characters refer to like parts.

THEORY

The particular machine which is described herein as an exemplary mechanization of the principles of applicant's invention is a serial binary digital computer wherein numbers are represented as fractions with all significant digits or bits considered to be positioned immediately to the right of the binary point and a bit in a sign position, immediately to the left of the binary point, indicating whether the number is positive or negative. Thus, if the bit immediately to the left of the point, the bit which precedes the number itself, is a 1 the number is known to be a negative number; whereas if the sign bit is 0 the number is a positive number. Further in the exemplary machine employed herein for purposes of exposition, negative numbers are represented in the 2's or true complement form. As well known, the 2's complement of a fractional binary number B is equal to $2^{\circ}-B$. Thus, for example, the number 0.1 0 1 represents the positive number ⅝ and the complement of this number is 1.0 0 0—0.1 0 1 which gives 1.0 1 1. The latter comprises a representation of the number —⅝. Thus, the number —⅝ is represented as the 2's complement of the number +⅝, that is, 1.0 1 1 is the 2's complement of 0.1 0 1.

With the above described system of notation, namely, employing 2's complement to represent negative numbers and representing the sign of a number by 1 or 0 in the bit position of most significance any binary number A can be represented as follows:

$$A=-a_n+\frac{a_{n-1}}{2^1}+\frac{a_{n-2}}{2^2}+\cdots\frac{a_1}{2^{n-1}} \qquad (1)$$

In this equation $n$ is the bit position of the sign bit and the negative sign in front of the bit in sign position $a_n$, indicates the convention utilized herein of designating a positive number with a zero in the sign bit and a negative number with a 1 in the sign bit. Accordingly —⅝ would be written in effect as —1+⅜(=—⅝) or 1.0 1 1 while +⅝ would be written —0+⅝(=+⅝) or 0.1 0 1.

It is known that one method of forming the 2's complement or obtaining the negative number is to invert all bits (to obtain the radix minus one or 1's complement) and then add a single 1 to the least significant bit position. Accordingly the negative of the number A of Eq. 1 may be written as $$-A=-a'_n+\frac{a'_{n-1}}{2^1}+\frac{a'_{n-2}}{2^2}+\cdots\frac{a'_1}{2^{n-1}}+\frac{1}{2^{n-1}} \qquad (2)$$

and multiplying both sides by —1 gives $$A=a'_n-\frac{a'_{n-1}}{2^1}-\frac{a'_{n-2}}{2^2}-\cdots\frac{a'_1}{2^{n-1}}-\frac{1}{2^{n-1}} \qquad (3)$$

Adding Equations 1 and 3 gives $$2A=-(a_n-a'_n)+\frac{a_{n-1}-a'_{n-1}}{2^1}+\frac{a_{n-2}-a'_{n-2}}{2^2}+\cdots\frac{a_1-a'_1}{2^{n-1}}-\frac{1}{2^{n-1}} \qquad (4)$$

Obviously $a_i$ and $a'_i$ (where subscript $i$ indicates any possible bit position) cannot both be true since the prime indicates the inverse. In Equation 4, if a given digit is a 1, the operation of addition is indicated; whereas if a digit is 0, the operation of subtraction is indicated. Notice however that the bit in the sign position has a negative sign in front of it, that is, the first term in Equation 4 is $(a_n-a'_n)$ so that a 1 in the sign bit position will uniquely indicate subtraction whereas a 1 in any other bit position indicates addition. Conversely a 0 in the sign bit position indicates addition whereas a 0 in any other bit position indicates subtraction.

In order to further explain the above concepts and to set forth the above algorithm from another point of view, we will start by stating that the 2's complement of the number A is equal to —A; whereas the 1's or radix minus one complement of A is equal to A' which is simply the inverse of A. The 1's complement may be converted to the 2's complement by simply adding 1 to the least significant bit. Accordingly, $A'+1\times2^{1-n}$ is the true complement of the number A and is equal to —A. The number 2A may be written as A minus its 2's complement which is equal to $(A'+1\times2^{1-n})$.

$$2A=A-(A'+1\times2^{1-n}) \qquad (5)$$

Thus if we are to multiply N by 2A, we get $$N(2A)=N(A-A'-1\times2^{1-n})=NA-NA'-N\times2^{1-n} \qquad (6)$$

Thus Equation 6 which is analogous to Equation 4 states that twice the product of two numbers N and A may be obtained by calculating the difference between the product of the two numbers and the product of one of the numbers with the inverse or 1's complement of the other and then subtracting the first number in the proper orders (e.g., $\times2^{1-n}$) from such difference. From an inspection of Equation 6, it will be seen that a major feature of the method for obtaining the product of N and A or, more specifically, twice the product of N and A, is to provide the product of N and A, provide the product of N and the inverse or 1's complement (A') of A, take the difference of the two products, and then subtract $N\times2^{1-n}$. Accordingly, the product NA may be obtained by conventional procedures while the product NA' may be obtained by subtracting the multiplicand from the previous partial product whenever the individual digit in the multiplier (where A is the multiplier in Equation 6) is a zero. More specifically it will be seen that if the multiplier be, for example, 1 0 1 0, the conventoinal multiplication procedures (least significant digit first) would tell us to perform no operation on the first step except a shift of the partial product of 0 0 0 0 to the right relative to the multiplicand since the least significant digit of the multiplier is a zero. The next digit being a one, conventional procedures tell us to add the multiplicand to the previous partial product then again shift the partial product to the right. The next digit, a zero, is the third most significant digit and tells us to perform no operation but simply to shift to the right. The fourth most significant digit is again a one, directing subtraction of the multiplicand from the previous partial product.

Now, of course, the inverse A' of A for the immediately preceding example, is 0 1 0 1 whereby according to conventional multiplication techniques, we would add the multiplicand on the first step since the least significant digit is a 1, then shift right whereas the second least significant digit of A', which is 0, tells us to perform no addition but simply to shift right again. The third least significant digit which is a 1 tell us to add the multiplicand to the last previous partial product and then shift right again. The last or most significant digit, which is a 0, tells us to perform no operation.

Usually it would be necessary to perform additions in the multiplication of $N \times A'$. However where we wish to obtain the negative of the product $N \times A'$ it will be readily appreciated that each partial product may be obtained by subtracting instead of adding so that the total NA' will in fact be the total —NA'. Consequently the result —NA' may be obtained by subtracting the multiplicand from the previous partial product whenever the bit in the multiplier A' is a 1. Of course, in the conventional multiplication of N and A, addition is called for whenever the digit in the multiplier is a 1.

It will be seen that we must perform two operations to obtain two products and the difference therebetween. The first operation is conventional multiplication of N and A where we add whenever the multiplier digit is a 1. The second operation is, according to the basic concept of the present invention, multiplication of N by the inverse A' where we subtract whenever the inverse of the multiplier digit is a 1 since we are obtaining the negative of this product. Now it will be apparent that since A' is the inverse (1's complement) of A, whenever the multiplier bit digit of A is a 1, the multiplier digit of A' must be a 0, and conversely whenever the multiplier digit of A is a 0, the multiplier digit of A' is a 1. Accordingly, when a 0 appears in the multiplier A, we immediately know that a 1 appears in the multiplier A' so that all three operations, the multiplication of N by A, the multiplication of N by A', and the obtaining of the difference between the products can be performed simultaneously. One simply looks at the multiplier A and, if a 0 appears, subtracts before shifting. If a 1 appears, we add before shifting.

In effect, what this procedure entails for the exemplary multiplier number 1 0 1 0 is as follows: (considering multiplication from least significant bit first) on the first step where we are looking at the least significant bit of the multiplier, we have no operation for the process of obtaining the product of N and A since the first digit of A is a zero. On the other hand, we immediately know that the first digit of A' is a 1. While we do not add the multiplicand on this first step since the first bit of A is a 0, we will, however, subtract the multiplicand on this first step since the first bit of A' is a 1. Then we shift the multiplicand left relative to the partial product, look at the second least significant digit of multiplier A which is a 1, and add the multiplicand to the previously obtained partial product. We know at this time that there will be no operation performed in obtaining the second partial product NA' since the corresponding digit, the second least significant digit of A' must be a 0. Accordingly, to perform the multiplication in accordance with the above-mentioned algorithm and further to perform such multiplication from the most significant bit first, we will shift the multiplicand right one bit, then add or subtract the multiplicand as indicated by the first or most significant bit of the multiplier. Then we repeat this step $n-1$ additional times. As the last step we subtract the number N in accordance with the last term on the right of the Equation 6 and Equation 4.

MACHINE STRUCTURE

Figures 1, 2:
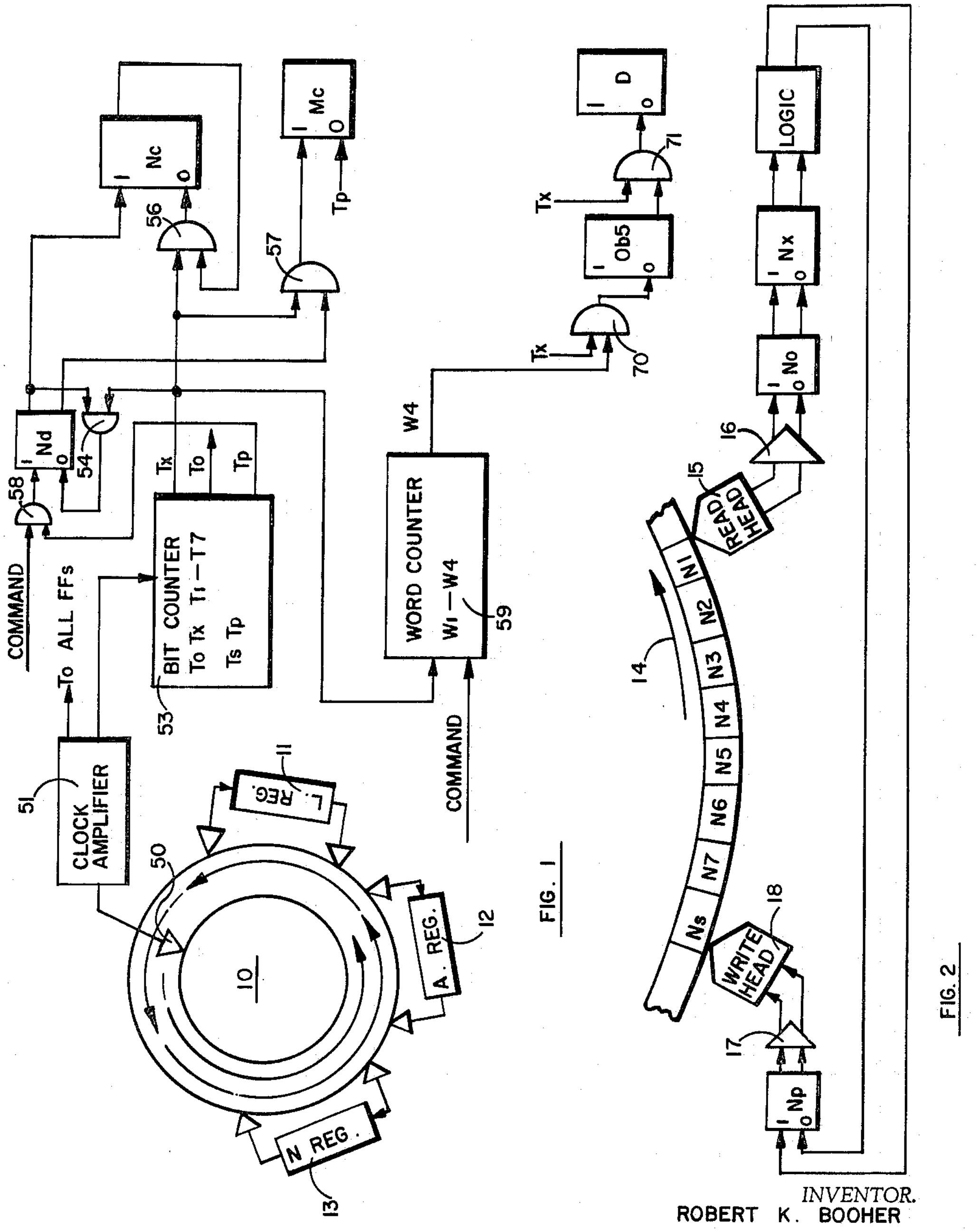
FIG. 2 is an illustration of a typical register.

In an exemplary machine which is capable of carrying out the multiplication, which may be termed a compatible multiplication in view of its similarity to the division and its use of similar logic, there are employed a number of conventional serial binary computing components and elements all of which are well-known to those skilled in the art and require no detailed description. For example, as illustrated in FIG. 1, the machine employs a rotating disc memory of the type more particularly described in United States Patent No. 2,899,260, issued August 11, 1959, to W. A. Farrand et al. for Magnetic Disc Recorder having a rotating disc 10 on which are magnetically recorded a number of channels of information. For the performance of the multiplication method described herein, there are required three recirculating registers indicated as the L register 11, the A register 12, and the N register 13 each of which includes a number of flip-flops external to the disc, a read head, write head and the storage of a number of bits on a channel of the disc as will be described more particularly in connection with the detailed description of the N register in FIGURE 2.

Except for the number of flip-flops employed external to the disc, each of the registers 11, 12 and 13 are substantially identical to the others. In the embodiment to be described herein, eight-bit numbers are employed wherein seven bits represent the number itself and the eighth bit is the sign bit. For the handling of such seven bit plus sign numbers, the register has a capacity of eleven bits where the extra bits are employed for timing and other purposes as will become more readily apparent as the description proceeds. Thus, as illustrated in FIGURE 2, the N register will include a portion of a channel of the disc 10 which includes eight bit positions illustrated as N1 through N7 inclusive and N*s*. As the disc 10 rotates in the direction of arrow 14, bit N1 is read by means of read head 15 and fed through an amplifier 16 to a read flip-flop N0. The input to each flip-flop is clocked as is all the flow of information through this computer. Thus upon each clock interval, the bit in flip-flop N0 is copied into a flip-flop N*x* while the bit in N*x* is copied into a flip-flop N*p*. Logic gates may be employed to control the flow of information between flip-flops such as, for example, flip-flops N*x* and N*p*. The bit in N*p* is fed through a write amplifier 17 and a write head 18 to be written into the bit position indicated as N*s* of the channel. Thus it will be seen that this conventional circulating register requires eleven bit times for each of the eleven bits, stored three in the flip-flop and eight on the magnetic disc, to appear in any one of the three external flip-flops N0, N*x*, and N*p* from which the number may be read out serially as is well-known to those skilled in the art.

The particular details of the registers, memory, and flip-flops form no specfic part of this invention since there are many well-known magnetic memories, flip-flops, recirculating registers, and the like which may or may not employ a magnetic memory which can be utilized in the practice of this invention. So too, the particular number of bits chosen for a register and the particular size of a register are selected herein merely for purposes of exposition since it is readily apparent that numbers of greater or smaller length may be employed. In an actual machine in which the present invention has been successfully embodied the word length is 33 bits and each register has storage spaced generally for about 33 plus two or 35 bits.

FLIP-FLOP

Illustrated in FIG. 3 is the circuitry of an exemplary flip-flop which may be employed in the practice of this invention. True condition is represented by —6 volts while false is ground in this machine. Two PNP transistors 20 and 21 are employed in a common emitter configuration with emitters connected to a source of voltage such as +1.25 volts with cross coupling in the form of resistors 22 and 23 from collector to base of each. These resistors provide the necessary regenerative paths to achieve switching and stability. Two output power amplifiers, including PNP transistors 24 and 25 are connected respectively to the collector outputs of transistors 21 and 20, as illustrated. A −6 volts supply is provided to the collectors of each of the transistors through resistors 26, 27, 28 and 29 respectively while the bases are connected to a source of +6 volts through resistors including those indicated at 30 and 31. When transistor 21 is conducting, its collector is at substantially +1.25 volts. Transistor 24 is biased to cutoff by the action of the resistive bridge including resistors 27, 22 and 30 together with the high output of conducting transistor 21. Because of the voltage divider action of resistors 27, 22 and 30, the base of transistor 20 is at a potential equal to or greater than +1.55 volts and transistor 20 is held at cutoff. When the flip-flop is in true state the collector of transistor 25 is at approximately −0.2 volts which is, substantially, the voltage level indicating false condition of the machine. The leakage path of transistor 20 is provided by resistors 30, 22 and 27 from the +6 volt supply. The base current drive for transistors 25 and 21 is supplied from the −6 volt supply through resistors 28, 23 and 31. A clock pulse which varies between zero volts false and −6 volts true is fed to the bases of each of transistors 20 and 21 by means of input diodes 33, 34, capacitors 35, 36, and diodes 37 and 38 respectively. The flip-flop operating pulses, the 0-set and the 1-set input pulses which are zero volts for false condition and −6 volts for true condition are fed to the respective inputs via diodes 39 and 40 respectively.

Assuming a true signal to the 0-set side of the flip-flop, namely a −6 volt input at the cathode of diode 40, capacitor 36 is charged to −6 volts during the clock pulse interval when the clock pulse is −6. The latter back biases the diode 34 to allow the −6 volt input to be fed to the capacitor through the input diode 40. When the clock pulse terminates and the clock goes to zero volts, diode 34 is caused to conduct and feed a positive signal through the capacitor and through diode 38 to the base of PNP transistor 21 which is accordingly cut off. Cutting off of transistor 21 provides, via the regenerative feedback resistor 22, a conduction of transistor 20 which causes the base of output transistor 25 to go positive. A positive base current to transistor 25 cuts off this PNP transistor whereby its collector goes to −6 volts. Accordingly, it will be seen that a 0-set input, a true signal to the 0-set side of the flip-flop, has resulted in a condition wherein the output at the zero side thereof is true. Similarly, a 1-set input to the other side of the flip-flop will cause the collector of output transistor 24 to go to −6 volts while the collector of transistor 25 goes to zero volts. Thus it will be seen that the functionally represented flip-flop boxes such as N*o*, N*x*, and N*p* of FIGURE 2 are illustrated as having two inputs and two outputs, a 1 input and a 0 input corresponding to the 1-set input through diode 39 and the 0-set input through diode 40 of the flip-flop of FIGURE 3. Similarly the corresponding pair of outputs of each of the flip-flops are obtained from the collectors of the output transistors 24 and 25 respectively.

Each pair of outputs of one flip-flop is sent to the corresponding input terminals of the next flip-flop or through logic as will be more particularly described. Thus, as illustrated in FIGURE 2 wherein the N*x* flip-flop copies the N0 flip-flop, it will be seen that the 1 output of the N0 flip-flop is applied to the 1-set input of the N*x* flip-flop while the 0 output of N0 flip-flop is applied to the 0-set input of the N*x* flip-flop. Further as can be seen in connection with the detailed illustration of FIGURE 3, it will be apparent that the flip-flop such as N*x* does not copy the flip-flop such as N0, to the outputs of which its inputs are connected, until the end of the clock pulse (e.g., until the clock goes false).

TIMING

In the exemplary embodiment of applicant's invention which is described the multiplication is achieved two bits at a time in order to substantially halve the time requirement for performing the entire operation. While the exemplary embodiment employs two-bit-at-a-time multiplication, it will be readily appreciated that the principles of the invention may be applied to serial multiplication which is one bit at a time or three or more bits at a time. However, the embodiment employing two-bit-at-a-time multiplication is chosen for illustration since it is the embodiment which has been reduced to practice and successfully operated in a machine which provides a compatible division operation which is itself a two-bit-at-a-time division and is described in my co-pending application for Division Apparatus.

Accordingly, with two-bit-at-a-time multiplication, the multiplication according to the principles of this invention requires a number of word times equal to two more than one-half of the total number significant bits in the numbers to be multiplied, that is, for the seven bit plus sign number employed in the exemplary embodiment, a total of six word times is required whereas for a word employing 32 bits, a total of 16 plus 2 or 18 word times would be required to perform the multiplication according to the principles of this invention. For use with $n$ bit numbers $n/2$ word times are required for the bulk of the computation. There is required an additional word time at the beginning of the operation in order to provide the proper set up of the registers and one additional word time is required at the end of the operation in accordance with the last term (−N) of the algorithm of Equations 4 and 6 which requires the additional subtraction.

The principles of the invention may be applied for multiplication $m$ bits at a time where $m$ is one, two, or more than two. Where the multiplication takes place, $m$ bits at a time, $m$ partial products are obtained each step of computation but the last, the multiplicand is shifted $m$ orders relative to the partial products register for each step but the last two and shifted $m-1$ orders for the next-to-the-last step.

For the purpose of setting up the timing of the exemplary eight bit or seven bit plus sign number there is provided, as illustrated in FIGURE 1, the usual clock pulses obtained from a read head 50 which reads a series of pre-recorded alternate 1's and 0's on the clock channel of the disc recorder and feeds these signals to a clock amplifier 51 which suitably amplifies and shapes these pulses to provide the clock waveform 52 (FIGURE 4) to all the flip-flops and circuitry as required by the logic to be set forth hereinafter. Since the registers chosen have space for storage of 11 bits, there is provided an eleven bit or modulo eleven counter 53 which counts pulses from the clock amplifier 51. This bit counter which is a conventional device counts eleven bit times respectively designated herein as T*x*, T*o*, T1 through T7 inclusive, T*s* and T*p* where the eleven bit times T*x* through and including T*p* represent one word time.

While this conventional bit counter modulo eleven counts eleven different bits, there are required for the purposes of this invention signals representing only three different ones of these eleven bit times, namely, bit times T*o*, T*x*, and T*p* (and their respective inverses). Accordingly, the outputs of the bit counter are shown to be solely three in number which are thus to be understood to occur at the indicated times. This timing is illustrated in FIGURE 4 where it will be seen that the output representing bit time T*x* is normally false (relatively high) and becomes true (relatively low) when the clock goes false at the end of T*p* bit time. T*x* remains true until the clock comes true and again goes false at the end of T*x* bit time at which instant the previously false T*o* output becomes true and stays true for one clock pulse cycle until the clock pulse again goes false. The several counting intervals T1, T2, T3, T4, T5, T6, T7, and $Ts$ are also indicated in the chart of FIGURE 4. It will be seen that at the end of $Ts$ bit time, the $Tp$ output of counter 53 will become true while at the end of the $Tp$ bit time, $Tx$ will become true and this latter becomes false with the initiation of $To$ bit time.

While many ways of providing for the required timing of the operations of the present invention will be readily apparent to those skilled in the art, there is illustrated for purposes of exposition a convenient manner and apparatus for obtaining unique indications of the first word time which is necessary for set up of the several registers and for providing a unique indication of the last two word times in which unique operations, distinguished from operations in word times 2 through 4 in the exemplary eight bit embodiment, are performed.

As illustrated in FIGURE 1, the multiply operation is initiated by a command signal applied to the starting flip-flop N$d$ for which the logic is as follows:

$$1Nd = Tp \text{ command}$$
$$0Nd = NdTx$$

At this point, it may be noted that in the setting forth of the logical equations herein, the Boolean terms of AND and OR are indicated by conventional symbology. The prime (′) of a symbol indicates the absence of the quantity or the condition false of such quantity. Flip-flops are designated by capital letters with appropriate lower case letters or numbers following as may or may not be necessary whereas the inputs to the flip-flops are designated by 1 or 0 preceding the indication of the flip-flop itself. Thus, for example, a true input to the one side of the N$d$ flip-flop is indicated by 1N$d$ whereas a true input to the zero side of this flip-flop is indicated by 0N$d$. Accordingly, from the logic just set forth, it will be seen that there is a true input to the 1-side of the N$d$ flip-flop by the command impulse which may be a pulse of relatively short duration in coincidence with the signal $Tp$ supplied through an AND gate 58. There is a true input to the 0-set side of the N$d$ flip-flop by the simultaneous occurrence of a true output of N$d$ and the existence of the $Tx$ time interval. In FIGURE 1, the 0-set input to the N$d$ flip-flop is provided by the AND gate 54 which receives as one of its inputs the output of the true side of the N$d$ flip-flop and, as the other of its inputs the signal $Tx$ from the bit counter. Accordingly, it will be seen that flip-flop N$d$ is set true by the initial command pulse at $Tp$ and is thereafter true only through the very next $Tx$ bit time by which it is triggered to become zero at the very next T0 time. The flip-flop N$d$ thus remains false from the initiation of the first T0 time of the first word time throughout the entire multiplication operation being true only for the very first $Tx$ bit time. The control timing and, in particular, the timing of flip-flop N$d$ is illustrated in FIGURE 5 which indicates that N$d$ flip-flop is initially true, being set true by the command pulse and then is triggered at $Tx$ bit time to become false at the very next T0 time where it remains throughout all of the word times of the multiplication operation.

For the purposes of uniquely representing the first word time, there is provided a flip-flop N$c$ which as indicated in FIGURE 5, is true for the first word time and false thereafter. The logic on flip-flop N$c$ is $$0Nc = NcTx$$
$$1Nc = Nd$$

As illustrated in FIGURE 1, the N$c$ flip-flop is 1-set by the true output of $Nd$ and is thereafter 0-set whenever it true by means of an AND gate 56 which receives an output from the one side of N$c$ and also the $Tx$ bit time signal.

For other timing purposes which will become apparent as the description proceeds, there is provided a flip-flop M$c$ on which the logic is $$1Mc = Nd'Tx$$
$$0Mc = Tp$$

As illustrated in FIGURE 1, the flip-flop M$c$ is set to 1 by means of an AND gate 57 which receives inputs from the $Tx$ true signal and from the N$d'$ signal indicating that the flip-flop M$c$ is set to 1 at the first $Tx$ time that the N$d$ flip-flop is false. M$c$ is set to zero at each $Tp$ bit time.

For the purpose of counting words and indicating the last and next to the last word times during which unique operations will occur, there is provided a conventional word counter 59 which counts the $Tx$ pulses from the bit counter 53. The word count of pulses $Tx$ is initiated by means of a command which turns the counter on. The word counter counts four word times W1 through W4. However, for the purposes of this invention, the conventional word counter need provide solely an output which indicates the fourth word time. As indicated in FIG. 5, the word counter output W4 is triggered true by the $Tx$ at the end of the third word time and is triggered to false condition by $Tx$ of the succeeding word time.

Certain additional flip-flops 0$b$5 and D are provided which are set true prior to the initiation of the multiplication operation by any suitable means of which the details form no part of this invention.

For the purpose of indicating the last two word times, word times 5 and 6 in the illustrated example, there is provided the flip-flop 0$b$5 on which the 0-set logic is $$00b5 = W4Tx$$

Thus, as illustrated in FIGURE 1, the signals $Tx$ and W4 are provided to the 0-set side of 0$b$5 by means of an AND gate 70. Accordingly, flip-flop 0$b$5 which is initially 1-set is triggered to the false condition by the bit time $Tx$ at the end of word time 4 and is accordingly uniquely false for word times 5 and 6.

The last word time is uniquely indicated by the false condition of flip-flop D on which the 0-set logic is $$0D = 0b5Tx$$

As illustrated in FIGURE 1, the D flip-flop is initially 1-set and is thereafter 0-set by the first $Tx$ occurring during the false condition of 0$b$5. The latter logic is achieved by means of an AND gate 71. The waveforms and timing on all of the flip-flops and word counter of FIGURE 1 are illustrated in FIGURE 5 wherein the bit times such as $Tx$, $To$ and $Tp$, which appear on the waveforms, indicate the trigger times of the changes of states of the several flip-flops.

GENERAL INFORMATION FLOW

With reference now to the general information flow diagram of FIGURE 6, it will be seen that the problem to be solved is the multiplication of an eight-bit number A (seven significant bits plus sign) stored in the A register by the number N stored in the N register. Thus the number in N is the multiplicand while the number originally in A register is the multiplier. The product will appear in both the A and L registers unrounded with the most significant bits initially stored in L register and the least significant bits of the product stored in A register. However, for purposes of performing additional computation steps which are required in the machine for which this invention was made, but which steps are not necessary for the multiplication itself, the two registers A and L are interchanged at the end of the operation during the last word time so that at the very end of the described operation, the final product appears with the most significant bits thereof in A register and the least significant bits in L register. The described multiplication is performed two bits at a time. For the exemplary eight bit number chosen for this embodiment the operation is completed in six word times. The illustrated registers are all of the recirculating type. Thus the N register 13 of FIG. 6 is indicated to be recirculating by means of the flow line 73 which indicates the bits from the low end of the N register, namely the right hand end thereof in the illustration, are transferred to the high end of the N register according to flow line 73 during the normal recirculation process. It is in this register that the multiplicand, the number N, is stored and is continuously recirculated during all word times. It will be assumed for the purposes of this description that the multiplicand has been set into the N register in bit positions N1 through $N_s$ thereof by well-known means of which the details form no particular part of this invention. The number in the A register 12, the multiplier, is shifted into the L register 11 during the first word time. The multiplier is then stored in the L register initially requiring all eight bit storage space of the L register, it being understood that the L register will have additional storage space as will be more particularly described hereinafter. It is to be noted that all registers are illustrated as storing numbers with least significant bits at the right hand portions thereof and higher, most significants bits at the left hand portions thereof. During the multiplication operation, the multiplier is precessed to the left and actually shifted out of the L register with most significant bits of the successive partial products obtained by adding and subtracting in A register appended to the previously obtained partial product in the L register at the low end thereof. Thus in the diagram, the L register 11 is indicated as containing the multiplier in dotted box 74 and the high end of the partial product in dotted box 75 with each of these numbers precessing to the left as indicated by the arrow immediately under the respective dotted boxes.

It is in the A register, which is zeroed during the first word time while shifting the multiplier therefrom to the L register, that the lower end of the successive partial products is initially stored. In this register too, the several additions and subtractions of the multiplication according to the above mentioned algorithm are carried out. As the several numbers in A and N are circulated to the right as indicated by the several flow lines 73 and 76 and 77, each bit, as it comes from the low end of the N and A registers respectively, is fed to an adder-subtractor 78 which receives bits from the low end of the N register, the multiplicand via lines 76 and bits from the low end of the partial product in the A register via line 77. The adder-subtractor 78 thus either adds or subtracts to or from the partial product in A the multiplicand as stored in N. As indicated above, in accordance with the algorithm upon which the principles of this invention are based, whether addition or subtraction occurs is determined by the individual digit of the multiplier. This operation is thus similar to the Von Neuman non-restoring division wherein the quotient determines whether or not addition or subtraction will occur. Thus the highest order digit of the multiplier (since the exemplary operation described herein is initiated from the high end of the multiplier) is fed via flow line 79 to an add-subtract indicator such as a flip-flop O2 which controls the operation of the add-subtract logic 78 to provide either addition or subtraction of the number in N to or from the number in A.

The sum or difference which is in effect the partial product appearing bit by bit at the output of the add-subtractor 78, is fed via flow line 80 to the upper end of the A register where at the end of each word time the lower end of the partial product may be seen. That is, at the end of each word time, the A register will contain the eight lowest bits of the partial product when the multiplication is of two eight-bit numbers. As the number in the A register, the partial product, is recirculated out to the right from the lower end and then in to the left at the higher end of the A register, this partial product is precessed or shifted two bits to the left for each word time. This two-bit shift or precession to the left of the partial product is the equivalent of course to a two-bit shift to the right of the multiplicand which is to be added thereto. The shift is two bits and not one bit in view of the fact that the multiplication is being carried out two bits at a time. The two bit precession is achieved by inserting two extra flip-flops in the A register to provide a two bit time delay in the recirculation of the numbers stored therein.

Upon completion of the two additions or subtractions of any given word time (by operation of adder-subtractor 78), the partial product in A is increased by having two more orders that it had previously since there has been a two-bit left shift and, in addition, there may be a carry. This situation is indicated by the dotted box labeled excess in the A register and the dotted box labeled carry. The two highest bits of the partial product are labeled excess in the illustration and comprise those which must be shifted into the L register since we are multiplying from most significant bit first and the A register has a limited storage space. Accordingly, at the end of each word time, these two excess bits are fed via flow line 81 to be appended to the lower end of that portion of the partial product which is stored in the L register, namely the higher end of the partial product. During each word time, this upper end of the partial product in the L register is precessed two bits to the left to allow room for the appending to the lower end thereof of the next two excess bits of the next partial product. The precession also presents the two multiplier bits to be used during the next word time.

Further, the partial product obtained as a result of the addition or subtraction operations which occur in adder-subtractor 78 may result in a carry or borrow which must be added to or subtracted from the high end of the partial product obtained from the previous word time. Accordingly a carry or borrow, if any, in the very highest order of the most recently obtained partial product of the A register is fed via information flow line 82 to a carry indicator here provided by a flip-flop C2. When there is a carry or borrow, it may be added to or subtracted from the previous partial product depending upon the sign of the multiplicand and the nature of the previous operation, e.g., whether the previous operation was addition or subtraction. Accordingly, there is provided logic dependent upon the nature of the previous operation and the sign of the multiplicand to set a carry indicator, here provided by a flip-flop C5, which will determine whether or not the carry in C2 is to be added or subtracted to or from the high end of the partial product stored in L. Thus, there is provided an adder-subtractor 84 which either adds or subtracts the carry in C2 according to the indication provided by C5 to the least significant bit of the previously obtained high end of the partial product stored in L. Since the carry, if any, set into C2 is but a single unit, the adder-subtractor 84 is essentially a one-input adder-subtractor. Thus the bits of the high end of the partial product are augmented or diminished by a single unit by means of the one input adder-subtractor 84, as the bits in L are recirculated by means of information flow line 85.

It will be seen then that the number in L is initially solely the multiplier. As each bit of the multiplier is employed, two bits being employed for each word time, it is no longer needed and thus it is discarded as the multiplier is precessed out of L toward the left. At the same time, the excess and carry, if any, obtained by the add-subtract operation, as provided in the A register, are appended or added into the low end of the L register and, successively during each word time, precessed two bits at a time toward the left to occupy the storage spaces originally occupied by the multiplier which itself is precessed to the left and discarded out of the L register. Consequently at the end of the last word time, the entire high end of the partial product would appear in L and the entire low end of the partial product in A except for the fact that the contents of these two registers are interchanged for purposes which form no significant part of this invention.

Illustrated in FIG. 7 is a detailed block diagram of the A and L registers together with necessary control and add-subtract circuitry for performing one complete multiplication operation. As will be seen from this figure, the A register includes its normal complement of eleven bit storage space, A1 through As together with Ao, Ax and Ap. Of these, as indicated in connection with the description of the N register in FIGURE 2, bits Ao, Ax and Ap may be flip-flops while the others are actually bit positions on the disc of the exemplary type of recirculating register. While the A register normally has storage space for eleven bits, the two-bit-at-a-time multiplication requires precession of the partial product two bits to the left during each word time. Accordingly, a two-bit delay is provided by inserting flip-flops Cr4 and Cr3 into the A register between flip-flops Ap and the bit position of As which actually would be, in an arrangement analogous to that shown in FIGURE 2, the insertion of flip-flops Cr4 and Cr3 between the flip-flop Ap and the write head which writes the bit into the As position on the disc channel.

It may be noted at this point that the diagram of FIGURE 7 represents the several logical AND, OR gates required for proper control of information flow by breaking the information flow line and inserting in the break the letters representing the control inputs to the gates. For example, the insertion of D in the break in the flow line from Cr4 to Cr3 indicates that Cr3 copies Cr4 only when the D flip-flop is true. In other words, the inputs of Cr3 are derived from the outputs of AND gates having as inputs thereto one output of Cr4 and the true output of D. Also where a flip-flop is not copying another but is set at some given condition, an appropriate input to the 0-set or 1-set side of the flip-flop is indicated by a 0 or 1 and a flow line to the flip-flop input therefrom. Such flow line is also broken for insert of the logic controlling such flow. For example FIGURE 7 indicates Cr4 to be 0-set by To. Lp is 1-set by the output of an AND having inputs Cr3 and Tx. A detailed description of all logic and certain mechanizations thereof will be set forth hereinafter.

When the described apparatus is embodied in a machine which performs division or other operations in which the same components are used, additional inputs uniquely representing the particular operation are employed for all gates operable upon shared components. For example, a flip-flop Ob6 copies Mn only during multiply but not during divide. Accordingly, in a machine using Ob6 in its division operation, the gate having inputs D To′ Tp′ controlling the copying of Mn by Ob6 would have an additional input such as Om, for example, uniquely indicating "operation multiply." Gates uniquely operable during division or other operations are not shown.

FUNCTIONAL DESCRIPTION

It is to be understood that at the beginning of disclosed multiplication operation the multiplicand is in the N register where is is recirculated and the multiplier is in the A register although the multiplicand could be read out of memory during the first word time if deemed necessary or desirable. According to the rules of the algorithm set forth above, we will multiply the number in N by the number initially in A after an initial setup which moves the multiplier from A to L and zeroes the A register. We add or substract N, the multiplicand, as indicated by the specific digits of the multiplier which is now in L and then effectively shift the multiplicand in N right one bit in preparation for the next step. We repeat this step $N-1$ more times and then N is subtracted from the last partial product. Accordingly, during the first word time, the number in A is transferred into the L register and is left shifted or precessed two bits by a delay including flip-flops Cr6 and Cr5 which, as indicated in FIGURE 7, are inserted between flip-flop Lp and the write amplifier writing into the Ls bit position in the same manner as the flip-flops Cr4 and Cr3 are inserted into the A register. The number in the N register and more particularly the bits appearing in flip-flop No theroef, is copied into a flip-flop Mn during every word time except the first.

At every Tx bit time, except the first, the add-subtract indicator O2 and a second add-subtract indicator flip-flop C6 (two of these indicators are needed since two additions or subtractions are occurring each word time) are set from the two most significant bits of the multiplier which appear in flip-flops Cr6 and Cr5 of the extended L register.

During every word time, except the first, the logic provides for addition or subtraction of the number in Mn (copied from the multiplicand in the N register) to or from the bits appearing in flip-flop Ax (the partial product) using add-subtract logic 78 including a carry-borrow flip-flop Ak and storing the sum or difference in flip-flop Ap. Flip-flop O2 indicates whether or not addition or subtraction is to occur in accordance with the algorithm set forth above as indicated by the particular digit of the multiplier (in Cr6) under consideration.

During every word time, except the first and last, the logic provides for addition or subtraction of Mn to or from the bit found in Ap using add-subtract logic 90 having flip-flop C4 storing the carry or borrow with the sum or difference stored in Cr4. C6 is employed to indicate whether addition or subtraction should occur on this step as indicated by the second highest remaining digit of the multiplier stored in Cr5. Thus two additions or subtractions are occurring during each word time by means of add-subtract logic 78 and 90 with respective sums being stored in Ap and Cr4.

During every word time, except the last and the next to the last, the effective bit weighting of the A register is reduced by two (that is, the partial product is left shifted or precessed left two bits relative to the multiplicand) by the delay provided by insertion of Cr4 and Cr3 in the A register loop. This two bit left precession of the partial product is essentially the equivalent of a two bit right shift of the multiplicand which is required for the multiplication.

During every word time, except the first and last, the L register is precessed left by means of the two bit time delay provided by insertion of flip-flops Cr6 and Cr5 into the L register loop. This two-bit left shift provides for the shifting of the multiplier out of the L register so that in each successive word time, the two next most significant bits will appear in Cr6 and Cr5 to provide an indication to add-subtract indicators O2 and C6. This two bit left shift of the number stored in the L register also vacates two bit positions at the lower end, the right hand end of L, wherein the excess of the partial product, the two highest bits of the lower half of the partial product obtained by the additions or subtractions in the A register, may be appended to the low end of the higher half of the partial product in L.

At the last bit time of each word time, except the first and last, the overflow bits that result from the addition or subtraction of the add or subtractor 90 are entered into the L register with the most significant of these two entered from Cr4 into Lx and the least significant from Cr3 entered into Lp.

INTERMEDIATE WORD TIME SCALING

The A register is cleared to zero during the first word time. During intermediate word times, Mn is added or subtracted to Ax in the Ap flip-flop and then Mn is added or subtracted to Ap in the Cr4 flip-flop with the result of the latter operation copied into Cr3 and thence into As. The numbers handled in the exemplary embodiment have seven significant bits with a sign bit and accordingly only one bit to the left of the binary point. The eight bits of the A register are handled as always positive throughout the intermediate word times and hence appear to be some number between zero and $+2-\epsilon$. That is, the number stored in A may be treated as a number between zero and something just less than +2. This is necessary since the A register cannot hold the entire product and the magnitude of the number in the A register is scaled at the end of each word time back to the range of 0 to $+2-\epsilon$ and all excess is stored in L. This is illustrated in the chart of FIGURE 14 wherein the range of A is indicated to be between zero and +2 initially. FIGURE 14 illustrates scaling during intermediate word times, $W_2$–$W_4$. The first step is the addition or subtraction of the multiplicand M*n* which extends the range of the number now in A to something between −1 and +3 (since M*n* is always less than one in magnitude). Upon left shifting of the partial product relative to the multiplicand by one bit, accomplished by the delay in the A*p* flip-flop, the number in A appears to have been multiplied by two to give a number now in A within the range of −2 to +6. To this number we again add or subtract the multiplicand to obtain a number within the range of −3 to +7. The second left shift of the partial product accomplished by the delay in the C*r*4 flip-flop then gives a number in the A register within the range of −6 to +14 all as indicated on the chart of FIGURE 14. Note that adding M*n* to A, whatever its range, can only increase or decrease the number in A by something just less than one since we are handling all of the numbers and, namely, the multiplicand, as a fraction. Accordingly, the number M*n* which is either added to or subtracted from A can never be more than one and thus can never increase or decrease the magnitude of the number in A by more than one.

It will be seen that the number now stored in A at the end of the word time will have an extra two bits and possibily an additional carry. For example, consider the highest positive number represented in FIG. 14. If the result of the operations of the second word time produced a number within the range of +12 to +14, the number in A at T*x* time would be 1 1 0 X.X X X X X X X (=8+4+0+XXXX etc.) where the bit positions A1 through A*s* are represented by X's to denote that the value of these bit positions are of no significance for purposes of our present discussion. However, C*r*3 (the second bit position to the left of the point) would have a zero therein while C*r*4 would have a 1 therein. The result of the add or subtract operation on the bit which is still in the A*p* position but has yet to go through the add-subtract logic 90 (and thus would appear in C*r*4 in the next bit time) would be a 1. Accordingly, we have a 1 in the bit position (most significant) of weight 8, a 1 in the bit position (third position to the left of the point) of weight 4 and a 0 in the bit position of weight 2. Bit positions of lower significance are of no moment but total a maximum of something less than 2 whereby 8+4 which is 12 plus something less than 2 gives a number within the range of +12 to +14. Now, in order to proceed to subsequent operations, it is necessary to rescale the number in A register to the range of zero to +2. Accordingly, the most significant bits 1 1 0 are removed from the higher end of the number in A, rescaling A to within the range of 0 to +2 and the bits so removed are inserted at the lower end of the L register.

The transfer of these most significant bits of the lower half of the partial product is done by simply appending the bits in weight positions 2 and 4, namely 0 and 1 in the example under discussion, to the lower end of the high half of the partial product previously stored in L since these two bits are both of lower weight than the weight of the least significant bit of the number previously stored in L. However, the bit in weight position 8 indicates that a single unit must be propagated into the low end of the previous partial product of L. This single unit must be added to the least significant bit of the partial product previously stored in L. Accordingly, this bit is added while the other two bits are merely appended. Similarly if the excess of A were such that A were between +10 and +12 at the end of the second third or fourth word time, the 0 1 (see FIG. 14) of weight positions 4 and 2, respectively, would be appended to the lower end of the previous partial product in L while the 1 of weight position 8 would be added to the least significant bit position of the previous partial product in L.

In the chart of FIGURE 14, the range of A of −6 as indicated as including a −1 in weight position 8 while the usual 0 and 1 in weight positions 4 and 2, respectively, give a total of −8+0+2=−6. Accordingly, if the operations were such that the range of A were as low as −6, the 0 and 1 would be appended to the lower end of the previous partial product stored in L while a 1 would be subtracted from the least significant bit of the previously obtained partial product. Thus whether A has to be augmented or diminished (whether it is greater than +2 or less than 0) the logic of appending the bits in weight positions 4 and 2 remains the same. That is, these bits are simply appended to the lower end of the previously obtained partial product. However, depending upon whether the range of A is greater than 2 or less than 0, the propagation, if any, in to the least significant bit of the previously obtained partial product must be achieved either by an addition or subtraction. Logic is provided for this purpose. Thus it will be seen that while the number in A is augmented by bits in two or more places at the end of each word time, the augmented bits of A are removed from the higher end thereof and appended or added to the lower end of the L register which accordingly stores consecutively obtained pairs of bits of successively lower order of the high end of the partial product.

To continue with this functional description, after removing the most significant bits obtained as a result of the last two additions or subtractions in the A register and inserting these in the L register, the cycle is repeated through the successive word times up and until the next to the last word time. That is, in the 8 bit number chosen for this exemplary embodiment the cycle repeats through word times 2, 3 and 4 and changes in word time 5.

In word time 5, there is provided a shift to the left of the partial product in A only after the first addition or subtraction. It is not necessary to multiply the result of the second addition or subtraction of M*n* in word time 5 since it is known that this is the last step of the multiplication while the next step, according to the algorithm set forth above, is simply the subtraction of M*n*, the multiplicand, from the difference N*a* −N*a*′. The change from a double shift to a single shift is simply accomplished by removing C*r*3 from the A register loop. Thus it will be seen in FIGURE 7 that A*s* copies C*r*3 according to the state of D and 0*b*5 which are in the flow line from C*r*3 to A*s* indicating that the copying of C*r*3 by A*s* occurs only while D and 0*b*5 are true.

With reference to the timing diagram of FIGURE 5, it will be seen that D is true for all but the last word time and 0*b*5 is true for all but the last two word times. During the next to the last word time, which is indicated by the condition 0*b*5′ and D, the bit in C*r*4 is copied into the A*s* bit position except at bit times T*o* and T*x* which condition is indicated on the drawing as T*ox*′ (e.g., "not" T*o* and "not" T*x*).

During the last word time, the multiplicand, which appears in M*n*, is subtracted from A in accordance with the last term on the right of the algorithm and the A and L registers are interchanged. Since it is possible during this last subtraction operation for a carry to propagate into the previous product bits at this step, there is the choice of taking an additional word time to let it propagate or of detecting it early (since it is known that the last operation is always subtraction) and letting this last carry or borrow propagate at the same time that the last subtraction is actually performed. In the described embodiment, the latter is chosen. Accordingly during the next to the last word time, a flip-flop 0*b*6 is employed to copy the multiplicand from Mn (thus getting the multiplicand and the partial product which will appear in Cr4 in the same time phase). A flip-flop 0b4 is employed to compare 0b6, the multiplicand, and the partial product in Cr4 to see whether a carry or borrow will be propogated into the L register as a result of the subtraction which will occur during the last word time. Actually the multiplicand from Mn now in 0b6 is subtracted from the partial product in Cr4 but the difference is not stored. Only the borrow is of interest and only such borrow is stored in 0b4 after being obtained by means of the borrow compare logic 95 of FIG. 7. If a carry or borrow does result as indicated by 0b4, it is compensated for during the last word time in accordance with logic based upon the truth table illustrated in FIGURE 16 as described hereinafter.

Magnitude scaling and transfer of the overflow bits of the A register into the L register during the last two word times is illustrated in the table of FIGURE 15 which will be described more particularly hereinafter.

It is noted that since the carry of this last subtraction is detected early, it is possible to have a carry of any one of +3, +2, +1, 0, −1, −2, or −3, with regard to the bit that was appended at the end of the next to the last word time, namely the bit that was copied from Cr4 and appended to the low end of the L register. However, if it is either a +3 or a −3 with respect to such bit, it is known that one of these units or a 1 from this +3 or −3 can be compensated for on the first pulse since no more than ±1 can propagate into the bits that were inserted just before the next to the last word time. Accordingly, the truth table of FIGURE 16 indicates the final comsation of the last two word times.

DESCRIPTION OF LOGIC

A complete set of logic is set forth at the end of the specification.

The N register which, upon initiation of the multiplication operation has stored therein the multiplicand, recirculates during the operation by means of the following logic:

$$_1Np = Nx\ Top'$$

where $$Top' = To'\ Tp'$$
$$_0Np = Nx'\ Top'$$
$$_1Nx = No$$
$$_0Nx = No'$$

During all but the first word time, the Mn flip-flop copies the multiplicand from the N register by $$_1Mn = Tp'\ Mc\ No$$
$$_0Mn = Tp'\ Mc\ No'$$

The operations achieved by this logic are illustrated in the chart of the N register and Mn flip-flop shown in FIGURE 8. Shown extending horizontally in this figure are the N register storage positions Nx, No and Np together with the Mn flip-flop. Extending vertically are the bit times for word times 3 and 4. It may be noted that the X's in the bit storage positions at particular bit times indicate digits which are of no significance for the problem concerned herein. Blank spaces in the chart are those within which straight forward shifting takes place. In the exemplary computation to be described herein, the N register stores in bit positions N1 through Ns inclusive the number 0 1 1 0 1 0 1 1 which is a positive number as indicated by the 0 in the sign position, Ns, and has seven significant digits. This number is the multiplicand which will appear in the Mn flip-flop during bit times T1 through Ts inclusive of each word time of the multiplication operation.

In the normal operation of this substantially conventional recirculating register, the digit in any given bit position such as in the No position at a given bit time appears in the next lower order position at the next bit time. For example, the least significant digit originally stored at Tx bit time in the N1 bit position is shifted into the No bit position where it appears at To. Thence it is shifted into the Nx bit position wherein it appears at bit time T1. Similarly, each of the other bits in storage positions N2 through Ns are shifted bit time by bit time so that each will appear in order at successive bit times in the Nx flip-flop in which, accordingly, can be seen the multiplicand during bit times T1 through Ts successively. Np copies Nx by the above logic so that the contents of the register repeatedly recirculates. It is to be noted that the sign bit originally in bit position Ns at the first Tx appears in No at T7 and thence appears in Nx at Ts. Since Mn is copying No and Nx is also copying No, both Mn and Nx will contain the same bits (e.g., be in the same time phase). Thus the multiplicand appears in Mn during bit times T1 through Ts inclusive with the sign bit, a 0 for this positive number, appearing in Mn at Ts bit time.

It will be noted from the logic on Np that this flip-flop does not copy Nx during To nor during Tp bit times. Accordingly, the sign bit of the multiplicand, which is in Nx at Ts bit time, is copied into Np wherein it appears at Tp bit time. However, since Np does not copy Nx at Tp, this sign bit then remains in Np where it appears at the next Tx bit time. This retention of a bit by a flip-flop is represented on the chart by an arrow in the particular flip-flop column extending from one bit time to the next. Accordingly, the two sign bits or, in this example, zeroes which are in Np at Tp and Tx, appear in Mn at Ts and Tp, respectively (this sign bit having been "stretched" in Np). Now it will be seen from the logic on Mn that Mn does not copy No at Tp. Accordingly, the zero in Mn at Tp remains in Mn wherein it appears at Tx. This retention of the sign bit is indicated by the arrow going from the Tp to Tx positions of the Mn flip-flop. This arrangement, in effect stretching the sign bit in the Mn flip-flop, is required for purposes of the multiplication to be described hereafter.

During the first word time the contents of the A register which comprise the multiplier of the multiplication operation are copied into the L register delayed two bit times by going through flip-flops Cr6 and Cr5. The logic on Lp for this operation is $$_1Lp = Ax\ Mc'\ Txp'$$

where $$Txp' = Tx'\ Tp'$$

$$_0Lp = Ax'\ Mc'\ Txp' + Nc\ To + Tp$$

It is noted that additional logic on Lp is provided as described hereinafter.

This operation of the shifting of the number in A into L is illustrated in the chart of FIGURE 12*a*, *b*, and *c* which together comprise a chart similar to that of FIGURE 8. In the chart of FIGURE 12*a*, *b*, and *c*, the several flip-flops of interest including control flip-flops, sum, carry and indicating flip-flops together with the significant flip-flops of both A and L register are indicated horizontally from left to right across both the top and bottom of the chart. Each bit time is represented with time extending downwardly from the top of the chart and all of the six word times of a particular example are set forth. The chart represents an actual multiplication operation according to the principles of this invention wherein the multiplicand is 0.1 1 0 1 0 1 1 and the multiplier is 0.1 1 0 0 0 1 0.

The copying of Ax by Lp is represented in FIGURE 12 by an arrow starting in the space containing the bit to be copied and terminating in the space containing the copied bit. This copying continues for successive bit times except where a different operation is indicated by a different arrow. Thus it will be seen from the logic on Lp that Lp copies Ax during the first word time when Mc is uniquely false but does not copy during Tx or Tp times. Lp is zeroed each Tp so that the copying of Cr3 at Tx, as described hereinafter, requires only 1-set logic on Lp. Further, the logic states that Lp is zeroed at the To time of the first word time indicated by Nc. This zero, it may be noted, is carried on through the L register, through word times 1 through 5 and appears in Lp at Tp of the next to the last word time. From this position, this zero is copied into Cr6 by the L register recirculation logic and thence is utilized to set the add-subtract indicator 02 for the very last subtraction of the multiplication operation.

During all but the last word time, the bit in Lp is copied into Cr6, thence into Cr5 and thence into the rest of the L register by $$ {}_1Cr6 = Lp\ D $$
$$ {}_0Cr6 = Lp'\ D $$
$$ {}_1Cr5 = Cr6\ D $$
$$ {}_0Cr5 = Cr6'\ D $$
$$ {}_1Ls = Cr5\ D\ To' $$
$$ {}_0Ls = Cr5'\ D\ To' $$

and Lx copies Lo by $$ {}_1Lx = Lo\ Tx' $$
$$ {}_0Lx = Lo'\ Tx'\ Tp' $$

Thus the multiplier in A is copied into Lp and thence is precessed during the first word time to appear in L3 through Cr6 respectively at the end of the first word time, the Tx bit time thereof. It may be noted here that the entire contents of both the extended A and extended L registers for the described computation are illustrated at Tx bit time of each word time in FIGURE 13. In FIGURE 13 the lower end of each partial product in A is underlined while the upper end of the partial product and the remaining multiplier bits are also underlined. Thus, as shown in FIGURE 13 the multiplier appears at Tx of the first word time in positions L3 through Cr6 with the latter representing the sign position while the A register including Cr4 and Cr3 is zeroed by logic to be described.

Flip-flop Cr4 is set false at To of the first word time and remains false during the entire word time since no gate on the 1-set side of the Cr4 flip-flop is true.

$$ {}_0Cr4 = To $$

Flip-flop Cr3 in turn copies Cr4 during all but the last word time:

$$ {}_1Cr3 = Cr4\ D $$
$$ {}_0Cr3 = Cr4'\ D $$

As copies Cr3 by $$ {}_1As = Cr3\ Ob5\ D\ Tox' $$
$$ {}_0As = Cr3'\ Ob5\ D\ To' + Tx $$

Ax copies Ao by $$ {}_1Ax = Ao $$
$$ {}_0Ax = Ao' $$

It may be noted that the zeroing of As at Tx is represented in the chart of FIGURE 12 by an arrow which begins at Tx bit time, denoting a Tx trigger, and ends in the As bit position at To denoting the fact that As is zero during To bit time due to the trigger at Tx. Similarly, the zeroing of Cr4 at To is denoted by an arrow which begins at To bit time indicating a trigger at To and ending at Cr4 position of T1 bit time to show that Cr4 thus becomes and remains zero during T1 because of the To trigger.

The zero inserted at the most significant end (into As) of the A register at each Tx time is required since bits of greater significance in the subsequently obtained partial products stored in A are removed from the A register and transferred to L. This zero replaces such bits and is treated as the actual sign bit of the lower half of the partial product.

The zeroing of Cr4 at each To (copied into Cr3 and then into As) inserts a zero at the least significant end of the number stored in A which is seen in A1 at each Tx time. This zero together with the zero which appears in Ap at T1 time is needed as a continuation of the zeroing of the A register which took place during the first word time.

In FIGURE 7, the copying of Ax by Lp is indicated by the flow line which is broken to include the gate Mc' Toxp' indicating the fact that Lp copies Ax only when Mc, Tp, Tx, and To are all false. Similarly the copying of Cr3 by As is indicated by the flow line including the gate 0b5 D Tox'.

To further explain the arrangement of FIGURE 7, reference is made to FIGURE 9 which shows, as an example, the actual mechanization of the logic on the flip-flop Lp which is illustrated by the flow lines and logical gates in FIGURE 7. It will be seen from FIGURE 7 that Lp has four different inputs. Each of these inputs will, of course, be applied to one or both of the 1-set side and the 0-set side. Accordingly, there are provided OR gates 96 and 97 of which the outputs are respectively applied to the 1-set and 0-set side of the Lp flip-flop. The inputs to these OR gates are derived from AND gates represented by the logic shown in FIGURE 7. For example, FIGURE 7 indicates a 1-set input via a gate Cr3 Tx. Thus there is provided the AND gate 98 having inputs Cr3 and Tx to provide one of the inputs to OR gate 96 which feeds the 1-set side of the Lp flip-flop. Another input to OR gate 97 derives from Tp and from AND gate 94 having inputs Nc and To. Flip-flop Lp also copies Ax by the logic Mc' Toxp'. Accordingly, AND gates 100 and 101 are respectively provided to the 1-set and 0-set OR gates 96 and 97 having the inputs Mc' Tp' Tx' To' in common with either Ax or Ax' respectively as an additional input thereto.

Also illustrated in FIGURES 7 and 9, as an input to the Lp flop-flop, is the add-subtract logic 104 of the one-input adder which adds or subtracts a carry in C2. This one-input adder does not operate in the first word time nor at Tx or Tp times. Accordingly, there is provided logic which will be more particularly detailed hereinafter which requires AND gates 105 and 106 having the indicated inputs thereto which provide two inputs to the 0-set OR gate 97. Also provided for the one-input adder logic are AND gates 107 and 108 which provide two additional inputs to the 1-set OR gate 96. Inputs to gates 105, 106, 107 and 108 not specifically shown in FIGURE 7 are included in the one-input adder logic. Accordingly, FIGURE 9 shows a detailed example of the mechanization of the diagram of FIGURE 7.

The detailed description of the logic continues. During the intermediate word times, that is, all but the first and last two word times (word times 2, 3, and 4 in the illustrated example), the contents of the N register recirculates by means of the logic set forth above while flip-flop Mn copies the N register as described previously. The successive contents of Mn which comprise the multiplicand, are illustrated in FIG. 12 for all bit times of a complete operation. It will be noted that at Tx of word time 1, Cr6 and Cr5 contain the most significant bits of the multiplier, namely the sign bit and the most significant digit thereof. It is from these bits that we derive an indication of whether addition or subtraction is to occur according to the algorithm which forms a major feature of this invention. It will be recalled that according to the algorithm, the sign bit is unique in its indication since a 0 sign bit indicating a positive number requires an addition whereas a 0 in any other bit will require subtraction. Accordingly, we will utilize the bit in Cr6 to set the add-subtract indicator O2 which is initially 0-set by $$ {}_0O2 = Nd $$

Thus, if Cr6 is true at time Tx of the first word time, flip-flop O2 is set true for the entire second word time by $$ {}_1O2 = Cr6\ Nc\ Tx. $$

$$ {}_1O2 = Cr6\ Nc\ Tx. $$

It will be noted than when 02 is true, subtraction is required whereas when 02 is false, addition is required.

If $Cr6$ is false at this $Tx$ time of the first word time, flip-flop 02 remains false for the entire word time. Since the add-subtract indication of the sign bit of the multiplier is unique, the copying of $Cr6$ or the other multiplier bits by 02 must be reversed for subsequent word times. Accordingly, for the remainder of the word times, flip-flop 02 copies flip-flop $Cr6$ by $${}_{1}02 = Cr6'\ Nc'\ Tx$$

and $${}_{0}02 = Cr6\ Nc'\ Tx$$

It may be noted that this logic on 02 is represented in part in FIGURE 7 by $(Cr6 \oplus Nc)'$ which is an "exclusive OR prime." This term, when expanded is $$Cr6'\ Nc + Cr6\ Nc'$$

Further, the "exclusive OR" $(Lx \oplus Lp)$ illustrated in FIGURE 7 in the 0-set logic of C2 expands to $$Lx\ Lp' + Lx\ Lp$$

As will become apparent from the add-subtract logic, the setting of the indicator flip-flop 02 determines whether the add-subtract logic for the carry or borrow should be used.

Substantially conventional add-subtract logic is employed. Flip-flop $Ak$ is used to store the carry or borrow and has the following logic:

$${}_{1}Ak = Mn\ Ax\ 02'\ Tox' + Mn\ Ax'\ 02\ Tox'$$
$${}_{0}Ak = Mn'\ Ax'\ 02' + Mn'\ Ax\ 02 + Tx$$

It will be noted that $Ak$ carry flip-flop is zeroed each $Tx$ as indicated in FIGURE 12 by the arrow starting at $Tx$ bit time and ending in the $To$ position of $Ak$. This zero remains in $Ak$ during T1 as indicated by the arrow from $To$ to T1 in $Ak$.

Flip-flop $Ap$ is employed as the sum or difference flip-flop having the logic $${}_{1}Ap = Mn\ Ax\ Ak\ Tox' + Mn\ Ax'\ Ak'\ Tox' + Mn'\ Ax\ Ak'\ Tox' + Mn'\ Ax'\ Ak\ Tox'$$
$${}_{0}Ap = Mn\ Ax\ Ak'\ Tox' + Mn\ Ax'\ Ak\ Tox' + Mn'\ Ax\ Ak\ Tox' + Mn'\ Ax'\ Ak'\ Tox' + Tx$$

Note that the flip-flop $Ap$ is zeroed each $Tx$ time as indicated by the arrow which starts at $Tx$ time and ends in the $To$ position of $Ap$. This is part of the continuation of the zeroing of the A register as previously described.

Since in the example under consideration, multiplication is accomplished two bits at a time, a second set of add-subtract hardware and logic is required. Accordingly, a flip-flop C6 is employed to act as an add-subtract indicator being set at each $Tx$ time by flip-flop $Cr5$ which contains at each $Tx$ time the second most significant digit remaining in the multiplier.

$${}_{1}C6 = Cr5'\ Tx$$
$${}_{0}C6 = Cr5\ Tx$$

For this second addition or subtraction of each word time, flip-flop C4 is utilized as the carry-borrow flip-flop having the logic $${}_{1}C4 = Mn\ Ap\ C6'\ D\ Tox' + Mn\ Ap'\ C6\ D\ Tox'$$
$${}_{0}C4 = Mn'\ Ap'\ C6'\ D\ Tx' + Mn'\ Ap\ C6\ D\ Tx' + To$$

It will be noted that C4 is zeroed at each $To$ time. Further the D on the 1-set side of C4 indicates that C4 is not required as the carry-borrow flip-flop during the last word time.

The sum and difference logic on $Cr4$ which is utilized to store the sum or difference of this second addition or subtraction is as follows:

$${}_{1}Cr4 = Mn\ Ap\ C4\ To'\ D\ Nc' + Mn\ Ap'\ C4'\ To'\ D\ Nc' + Mn\ Ap\ C4'\ To'\ D\ Nc' + Mn'\ Ap'\ C4\ To'\ D\ Nc'$$

and $${}_{0}Cr4 = Mn'\ Ap\ C4\ To'\ D + Mn\ Ap'\ C4\ To'\ D + Mn\ Ap\ C4'\ To'\ D + Mn'\ Ap'\ C4\ To'\ D + To$$

Thus it will be seen that $Cr4$, the sum or difference flip-flop, is zeroed each $To$ and operates during all but the last word time.

The mechanization of the add-subtract logic on $Ap$ and logic on a carry flip-flop $Ak$ for the first addition-subtraction of each word time is illustrated in FIGURES 10 and 11. As shown in FIGURE 10, the logic on the 1-set side of carry flip-flop $Ak$ comprises an OR gate 110 having as one of its inputs the output of an AND gate 111, the latter has the inputs $Mn\ Ax\ 02'$ and $Tox'$ as indicated by the previously described logic. A second input to 1-set OR gate 110 is derived from the output of a second AND gate 112 having the indicated inputs thereto. In a like manner, the 0-set side of $Ak$ derives its true signal input from the output of an OR gate 113 having three inputs of which one is derived from the $Tx$ bit time signal. A second and third input to the OR gate 113 is derived from AND gates 114 and 115 having the indicated inputs thereto.

The mechanization of the logic on the sum-difference flip-flop $Ap$ is illustrated in FIGURE 11. The 1-set side of flip-flop $Ap$ derives its true signal from the output of an OR gate 120 having four inputs thereto from AND gates 121, 122, 123, and 124 respectively. Each of these AND gates has the input thereto as indicated in FIGURE 11. Similarly, the 0-set side of $Ap$ derives its true signal from an OR gate 125 having, as one of the inputs thereto, the $Tx$ signal. The other four inputs to OR gate 125 are derived from AND gates 126, 127, 128 and 129 respectively having the indicated inputs thereto.

During intermediate word times, W2–W4, flip-flop $Cr3$ copies $Cr4$ by the logic previously set forth.

Flip-flop $As$ in turn copies $Cr3$ during all but the last two word times by the logic previously set forth and is zeroed at each $Tx$.

As previously described in connection with the scaling and transfer of FIGURE 14, it will be seen that after the first two additions or subtractions, at $Tx$ of W2, the A register has two additional most significant bits which can be seen at $Tx$ time in $Cr4$ and $Cr3$ respectively. At the $Tx$ of word time 2 in the example illustrated in this description, $Cr4$ contains a 1 and $Cr3$ contains a 0.

These bits are underlined in FIGURE 12 since they comprise the excess in A register which is transferred to L register.

In order to rescale A to where this low half of the partial product will still be able to fit within the eight-bit space of the A register, these two most significant bits are removed from the high end of the A register and appended to the low end of the L register which will thus store the most significant half of the partial product. To this end, the most significant of these two bits, that in $Cr4$ at $Tx$ is copied into $Lx$ at $Tx$ time while that one of these two bits of lesser significance, namely the bit in $Cr3$, is copied into $Lp$ at $Tx$ bit time. Upon recirculation, these two recently appended bits can be seen in the high end of the partial product stored in L at the next $Tx$ time (FIGURE 13). Accordingly, $Lx$ copies $Cr4$ by $${}_{1}Lx = Tp$$
$${}_{0}Lx = Cr4'\ Nc'\ Tx$$

Similarly, $Lp$ copies $Cr3$ by $${}_{1}Lp = Cr3\ Tx$$

No gate is required on the zero side of $Lp$ since $Lp$ is set to zero at each $Tp$ by the $Lp$ logic previously set forth. Note that the one which is in $Lx$ at $To$ of W1 together with the zero which is in $Lp$ at $To$ form a barrier to prevent the propagation of any carry in C2 beyond the most significant half of the partial product and into the multiplier. Note also that $Cr3$ is always zero at $Tx$ of W1 to provide the zero in $Lp$ at $To$.

INTERMEDIATE WORD TIME CARRY

The operations which take place during each intermediate word time and result in the two excess bits which must be transferred from $Cr4$ and $Cr3$ to $Lx$ and $Lp$ respectively, also may possibly result in a carry which would be in $Ap$ at this $Tx$ bit time except for the fact that it must yet go through the add-subtract logic. Accordingly, this carry, if any, which is a digit of an order of significance greater than that of the bit in $Cr4$ at $Tx$ will subsequenty appear in $Cr4$ at $To$. Consequently, if $Cr4$ is a 1 at $To$, a carry is indicated which must be added to or subtracted from the least significant bit of the partial product previously stored in the L register, as explained in connection with the previous description of FIGURE 14. Accordingly, flip-flop C2 is empolyed to store the carry, if any, indicated by $Cr4$. The logic on C2 is as follows:

$$_1C2=C2'\ Cr4\ Nc'\ To$$
$$_0C2=Tp+C5'\ Lx'\ Nc'\ Tox'+C5\ Lx\ Nc'\ Tox'$$

In accordance with the usual operation of a one input adder, the carry is turned on and remains on when adding until a zero occurs in the number into which the unit is being added. Then the carry is turned off. Similarly when subtracting the carry remains on until a 1 appears in the number to which the unit is added and then the carry is turned off. Flip-flop C5 is employed as an add-subtract indicator for the 1 input added as will be more particularly described below. From the above-described logic, it will be seen that the 1-input added carry flip-flop C2 is a 0-set at each $Tp$ and thence, if it is 0, it is set to 1 whenever $Cr4$ is 1 at D $To$. If $Cr4$ is 0, C2 retains its false state. The C2' in the gate on the one side is to disable the gate if C2 is already on due to other logic which will come into play at $Tx$ of W5. Thus, if a carry exists, $Cr4$ is true at $To$ and C2 is 1-set to turn on the 1 input adder-subtractor 104 of FIGURE 7. In accordance with standard logic of a 1 input adder, each digit is reversed until a zero occurs if adding or until a 1 occurs if subtracting. Accordingly, the logic on $Lp$ for this 1 input adder is as follows:

$$_1Lp=Lx'\ C2\ Nc'\ Txp'+Lx\ C2'\ Nc'\ Txp'$$
$$_0Lp=Lx\ C2\ Nc'\ Txp'+Lx'\ C2'\ Nc'\ Txp'$$

This logic on $Lp$ is indicated by the add-subtract logic 104 of FIGURE 7. Accordingly, it will be seen that the carry flip-flop C2 is 1-set by $Cr4$ if $Cr4$ is true meaning a carry is to be propagated into the previously obtained partial product. If a carry is to be propagated (if C2 is true), $Lx$ is inverted as it is copied into $Lp$ until C2 is turned off by a zero in $Lx$ if adding or a one in $Lx$ if subtracting.

For proper bit timing of this one input adder, it is noted that the least significant bit of the previous partial product, which is in L1 at $Tx$ (FIG. 13) is in $Lx$ at T1 at which T1 bit time, C2, becomes 1-set (by $To$ trigger), if at all. Accordingly, the carry of the A register overflow is added or subtracted to the least significant bit of the previous partial product stored in the L register.

In each intermediate word time, two additions or subtractions are occuring. The add-subtract operation, which is controlled by add-subtract indicator 02, operates upon a bit of higher significance than the operation controlled by C6. Accordingly, this operation of greater significance will determine whether or not the carry, if any, is to augment or diminish the previously obtained partial product.

The multiplicand $Mn$ can be either positive or negative, while the operation occuring under the control of 02 can either be addition or subtraction. If the operation is addition of a positive number or subtraction of a negative number, any carry which may result must be such as to increase the magnitude of the result. Accordingly, the carry, if any, must be added. Similarly if a negative number is being added or a positive number is being subtracted in the operation controlled by add-subtract indicator 02, any carry or borrow which results must operate to decrease the magnitude of the result. Accordingly, the one input adder-subtractor 104 operates to subtract such carry.

Add-subtract indicator C5, which determines whether the carry is to be added or subtracted, copies the sign of the multiplicand at bit time T3 and changes state, if during the previous word time subtraction had occurred, indicated by flip-flop 02 true. The logic on C5 is as follows:

$$_1C5=Mn\ D\ Ts+02\ C5'\ Tx$$
$$_0C5=Mn'\ D\ Ts+02\ C5\ Tx$$

Addition is indicated by false state of C5 while the true state of C5 indicates subtraction.

This logic may be explained as follows. If the multiplicand is positive, then $Mn$ at $Ts$ is 0 whereby C5 becomes 0. Then at $Tx$ bit time, when the one-input adder begins its operation, C5 will remain zero (it will not change state) if the previous operation had been addition indicated by 02 being false. In other words, the carry, if any, is added (e.g., C5 false) since a positive multiplicand was added.

If the multiplicand is negative ($Mn$ at $Ts$ is 1), C5 becomes 1 and then at $Tx$ remains 1 if the previous operation had been addition, indicated by 02 false. In other words, this set of circumstances would require subtraction of the carry (e.g., C5 true) if a negative number had been added. Similar observations may be made for the conditions wherein the previous operation was subtraction indicated by 02 true. Consequently, it will be seen that if there is a carry (indicated by $Cr4$ true) to be handled by the one-input adder-subtractor 104, the state of C5 will control whether or not such carry is to be added or subtracted to the least significant bit of the previously obtained partial product stored in $Lx$.

PRECESSION OF L

During the intermediate word times, word times 2, 3, and 4 in this example, the contents of the L register are precessed left two bits by going through flip-flops $Cr6$ and $Cr5$ in accordance with the logic previously set forth for $Cr6$, $Cr5$, $Ls$, and $Lx$.

During these intermediate word times the A register copies the new partial product or, more particularly, the lower end of the new partial product, which appears in $Cr4$ in accordance with the logic previously set forth for $Cr3$, $As$ and $Ax$.

It will be seen that during each intermediate word time two additions or subtractions take place under control of the two most significant bits of the multiplier which have not previously been used. When these two most significant bits of the multiplier which appear at any given word time in $Cr6$ and $Cr5$, have been used to set add-subtract indicators 02 and C6 respectively, they are precessed out of the L register and the remaining bits of the multiplier are precessed two bits to the left. Consequently the two next most significant bits will appear at the next word time in $Cr6$ and $Cr5$ where they may be utilized to control indicators 02 and C6 for the additions or subtractions of the next word time. As the multiplier is precessed left two-bit positions for each word time, the excess bits or overflow of the partial product from the A register are appended to the low end of L where they may be seen at the $Tx$ bit time of the next word time in positions L2 and L1. These most significant bits of the partial product are likewise precessed two-bit positions left for each word time taking up two bit positions which are no longer required by the remaining multiplier bits. The precession of the most significant partial product bits to the left thus makes room at the low end of the L register for the next two overflow bits to be appended thereto. This series of operations for the particular multiplication problem set forth in the chart of FIGURE 12 is illustrated in connection with FIGURE 13 which depicts the specific digits in each of the indicated bit positions of the A register and L register as extended to include $Cr3$ through $Cr6$ respectively. The contents of these registers are indicated at each $Tx$ time of the indicated word times W1 through W6. The multiplier bits which appear initially in positions L3 through Cr6 in the L register are underlined for each of word times 1 through 4. The lower half of the partial product stored in positions Al through As inclusive is also underlined for each word time. Similarly, in FIGURE 13 the most significant bits of the partial product which are appended to the low end of the L register are also underlined, the partial product increasing in number of orders as the multiplication operation proceeds. Thus, it may be seen, for example, that the partial product stored in L at Tx of word time 3 is 0 1 0 while the excess bits or overflow of A at such time are 1 0 in Cr4 and Cr3 respectively. These bits 1 and 0 may be seen appended to the low end of the previous partial produce in L at Tx of word time 4 where the partial product now stored in L is 0 1 0 1 0. It may be noted at this point that the contents of A and L are interchanged during the last word time so that the most significant half of the product will appear in A and least significant half of the product will appear in L.

LAST TWO WORD TIMES

As can be seen from the timing diagram of FIGURE 5, 0b5 becomes false, triggered at Tx of word time 4 and remains false thus throughout word times 5 and 6 whereas flip-flop D becomes false and remains false uniquely through the last word time.

Since the next to the last word time includes the last of the two additions or subtractions which conclude the actual multiplication (except for the last step of subtraction of the multiplicand, according to the logarithm of this invention) Cr3 is removed from the A register loop in order to provide but a single left shift of the partial product relative to the multiplicand in this operation. Accordingly, flip-flop As copies Cr4 during the next to the last word time by $$_{1}As = Cr4\ 0b5'\ D\ Tx'$$
$$_{0}As = Cr4'\ 0b5'\ D\ To'$$

Cr6 is 0 at Tx of the next to the last word time having copied this 0 from the 0 which was set into Lp at To of the first word time. Accordingly, the 0 of Cr6 at Tx of the next to the last word time sets 02 true to provide an indication of the last subtraction of the multiplicand from the difference of the two products which has in effect already been obtained. After this last subtraction, the least significant bits of the product appear in Ap, being stored there according to the add-subtract logic on Ap using Ak as the borrow flip-flop, as previously described.

Since it is desired, in connection with the machine for which the described embodiment of the invention is designed, to complete the operation with the most significant half of the product in A and that half of lesser significance in L, the contents of A and L are interchanged during the last step. Accordingly, the L register copies the results of the last addition by:

$$_{1}Ls = Ap\ D'\ To'$$
$$_{0}Ls = Ap'\ D'\ To'$$

The most significant half of the product, in L, is copied into C4 and thence into the A register via Ap as follows:

$$_{1}C4 = Lp\ D'\ To'$$
$$_{0}C4 = Lp'\ D'$$

Further, the A register copies C4 by:

$$_{1}As = C4\ D'\ Tox'$$
$$_{0}As = C4'\ D'\ Tox'$$

Note that FIGURE 7 illustrates flip-flop C4 in dotted lines during the last word time in order to simplify the drawing. The timing of the contents of the registers together with appropriate delays during the interchange serve to divide the product 2NA by two.

SCALING FOR LAST TWO WORD TIMES

The scaling of the number in A and the transfer of the overflow and carry digits from A to L during the last two word times is unique in view of the fact that, as previously described, the carry, caused by the very last subtraction (which takes place during the last word time) is detected early and allowed to propagate during this last word time. While such additional carry is being propagated, the carry, if any, from the last of the regular additions or subtractions occurring during word time 5 must also be propagated, and in addition, the overflow bits of such last two additions or subtractions must be appended to L.

In review, at the end of W4 we take the most significant half of the partial product in the L register at time Tx of W4 which is the number 0 1 0 1 0 and append the bits in Cr4 and Cr3 (which are each 0) at Tx of W4 to the lower end of this number, namely, to the bit positions in Lx and Lp at Tx. Thus we get the most significant half of the partial product in the L register to be the number 0 1 0 1 0 0 0 with the two least significant zeros just appended and obtained from the two most significant bits of the least significant half of the partial product just obtained in the A register.

Then if Cr4 is true at To of W5, a carry occurs and we will add or substract a single 1 (by means of the one input adder logic on C2) to the digit (in Lx at T1) in the third highest order of the number 0 1 0 1 0 0 0 to which we have just appended the digits from Cr4 and Cr3 respectively. The most significant half of the partial product then shows up at Tx of W5 in bit positions L1 through L7 (see FIGURE 13).

During W5 we are also performing the last two of the regular (as distinguished from the very last operation) additions or subtractions but shift only after the first of these and do not shift the partial product left after the second. The omission of this second shift is provided by removing Cr3 from the A register at this time. As indicated in FIGURES 7 and 12, As now copies Cr4. The second of the last two regular operations is, in the illustrated example, the subtracting of the multiplicand in Mn from the partial product which appears in Ap during W5 in bit times T1 through Ts inclusive. Since we shifted the partial product in A register only once during W5, we will append only the single most significant bit of this least significant half to the lower end of the most significant half in L. This most significant bit which we will now append is that bit which shows up as the sum or difference in Cr4 at Tx of W5. This bit in Cr4 at Tx is copied into Lx by the previously set forth logic on Lx. Note also that at this Tx bit time Cr3 is also copied into Lp as in previous word times. While this bit from Cr3, which is in Lp at To of the last word time, is not required as a part of the most significant half of the product, it is required for the zero set logic on the carry flip-flop C2 which will be described presently.

Since it is possible for a carry to propagate into the previous product bits upon completion of the very last subtraction, we have the choice of taking an additional word time to let it propagate or the alternative choice of detecting it early (since we always subtract during the last word time) and letting it propagate at the same time we are actually performing the last subtraction. In the illustrated embodiment, we choose to do the latter. Therefore, during the next to the last word time, W5 in this example, we use 0b6 for a one bit time delay to copy the multiplicand from Mn thus getting the multiplicand and the partial product in the same time phase.

$$_{1}0b6 = Mn\ Tp'\ To'\ D\ 0b5'$$
$$_{0}0b6 = Mn'\ Tp'\ D\ 0b5' + To$$

Flip-flop 0b4 is utilized to compare the multiplicand now in 0b6 with the very last partial product which appears in Cr4 in order to see if a carry or a borrow will be propagated into the L register as a result of the subtraction which will occur during the last word time. If a carry or borrow will result it is compensated for during the last word time by the logic on flip-flop C2.

More specifically, the early detection of carry or borrow, if any, of the last word time is obtained by performing the last subtraction during the next-to-the-last word time without storing the sum but only detecting in 0b4 the borrows, if any, of this very last subtraction.

$$_{1}0b4 = Cr4'\ 0b6\ D\ 0b5'\ To'$$
$$_{0}0b4 = Cr4\ 0b6'\ D\ 0b5' + To$$

It is noted that during the next-to-the-last word time Cr4 will contain the least significant half of the very last partial product which results from the second of the two additions or subtractions which are performed during W5 in accordance with the previously described add-subtract logic. There is no left shift of the partial product after the second of these last two operations. This last partial product appears in Cr4 during bit times T2 through Tp of W5. Starting with bit time T1 of W5, 0b6 copies Mn and therefore the multiplicand is contained in 0b6 during bit times T2 through Tp of the next to the last word time where it is in the same phrase as the least significant half of the partial product contained in Cr4 at this word time. Now we complete the subtraction of 0b6 (e.g., the multiplicand, from Cr4 which is the equivalent of the step we always take in the very last word time by subtracting the multiplicand in Mn from the least significant half of the partial product in Ax. If we complete this subtraction of 0b6 from Cr4, before completion of the subtraction of the last word time, we will know whether or not there is a borrow to be carried into the least significant bit of the most significant half of the partial product stored in the L register at the beginning of the last word time. The standard borrow logic is utilized to obtain the borrow, if any, in 0b4 of the subtraction of 0b6 from Cr4 and 0b4 is used in the modified logic on flip-flop C2.

The complete logic on the one input adder flip-flop is $$_{1}C2 = C2'\ Cr4\ Nc'\ To + C5\ 0b4'\ 0b5'\ Tx + C5'\ 0b4\ 0b5'\ Tx$$

$$_{0}C2 = Cr4\ Lx'\ Lp'\ To\ C2\ D' + Cr4'\ Lx\ Lp'\ To\ C2\ D' + Cr4'\ Lx'\ Lp\ To\ C2\ D' + Cr4\ Lx\ Lp\ To\ C2\ D' + C5'\ Lx'\ Nc'\ Tox' + C5\ Lx\ Nc'\ Tox' + Tp$$

Note that the first term of $_{1}$C2 is operative for all but the first word time while the second and third terms operate only for Tx time of W5. The last three terms of $_{0}$C2 are the same as those described previously in connection with word times 2, 3, and 4 while the first four terms of $_{0}$C2 operate only at the last To time of W6.

The borrow, if any, which is detected early in 0b4 will provide a carry or borrow, if any, to be added or subtracted to or from the least significant bit position of the most significant half of the partial product which is stored in the L register. This least significant bit is the bit which is copied into Lx from Cr4 at Tx of W5. This least significant bit accordingly shows up in Lx at To wherefor the carry, if any, indicated by 0b4 at Tx is utilized to have the carry flip-flop C2 set at To if required. In the example illustrated in C2 is true at To time of W6 since 0b4 was true and C5 was false at Tx time of W5. It will be noted here that the carry flip-flop C2 is controlled by the very last subtraction carry from 0b4 at bit time To whereas the carry flip-flop C2 is also controlled by the carry or borrow from the second of the two regular additions or subtractions which took place in W5 at the very next bit time. Consequently, the carry from the second of the last two regular additions or subtractions operates on the second lowest order bit of the most significant half of the partial product while the carry or borrow, from the very last subtraction as controlled by 0b4 operates on the very lowest order bit of the most significant half of the partial product.

With reference to the transfer of overflow from A to L during the last two word times and the rescaling of the number in A, FIGURE 15 illustrates that the initial range of A is treated as being between 0 and +2 as stated previously in connection with the description of FIGURE 14. Upon adding or subtracting Mn which is less than 1 (since all numbers handled in the machine are fractions), the number in A is within the range of −1 and +3. A single left-shift of the partial product occurs during the next to the last word time which is in effect a multiplication by 2 to obtain a range of A between −2 and +6. The second of the last two regular additions or subtractions of Mn will provide a range of A between a −3 and a +7. Accordingly, the number in A, if the operations were such as to bring the number up to the range of +7 might be written as follows: 1 1 0.X X X X X X X. Where the X's indicate digits which do not affect the problem immediately under consideration. If the two most significant bits are each 1 (denoting a number of at least 6) the third most significant bit (immediately to the left of the point) must be 0 since it is known that the several operations cannot result in a number greater than 7. The two digits 1 and 1 in the second and third places to the left of the binary point indicate bits which might exist in Cr4 at Tx to To times of word times W5 and W6 respectively, if the number is at its maximum value, between +6 and +7. In order to rescale this number in the A register back to within the range of 0 to +2 the two most significant digits must be removed. Accordingly, the digit in the second bit position to the left of the point is appended to the low end of the previously obtained partial product. This is obtained, as before, by copying into Lx the bit in Cr4 at Tx of W5. Similarly, the bit which appears in the third position to the left of the point having a relative weight of 4, will appear in Cr4 at To of W6 and is added to the least significant bit of the previously obtained partial product, namely, the bit which appears in Lx at T1 of W6. Thus upon rescaling A to within the range of 0 to +2, the final subtraction of Mn will bring about a range of −1 to +3. Accordingly, to rescale A to the range of 0 to +2, a single unit may be added or subtracted into the bit position where the bit in Cr4 at Tx of W5 was appended, namely, into Lx at To.

To recapitulate, it will be seen that at each Tx time of the intermediate word times 2 through 4, the partial product in A includes eight bits with the most significant of these being stored in As into which it had been copied from Cr3. The ninth and tenth most significant bit positions are in flip-flops Cr3 and Cr4 respectively. The eleventh bit, if any, of this partial product in A (including the overflow) would be in Ap except for the fact that it has not yet had Mn added thereto. Accordingly this eleventh bit will show up in Cr4 one bit time later, namely, at To at which time it is to be added to the last bit that has been previously put into the L register. Consequently, A is rescaled and eight bits are retained in A while the ninth and tenth most significant bits and the eleventh bit, if any, are transferred to the low end of the L register.

At the Tx bit time of word W4, there will still be in As the eight lowest bits of the partial product. The ninth lowest bit of the partial product is in Cr4 at this Tx since there has been only one left shift of the partial product during word time, W5. The tenth most significant bit of this partial product at this time will appear in Cr4 at To (just as the eleventh bit previously appeared in the intermediate word times) where it is added (by the one input adder) just as the bit in Cr4 at To was added in previous word times. For the early detection of the final carry, Mn is copied into 0b6 for phasing purposes and then 0b6 is subtracted from Cr4 using 0b4 as the carry. This subtraction provides the carry, if any, in 0b4 at Tx. This carry in 0b4 then must be added to the ninth bit position of the number in A at Tx. This ninth bit position is in Lx at To by virtue of copying of Cr4. Note that the carry, if any, in Cr4 at To may set C2 at T1 so that this carry is added to the L register at a higher order than the order to which the 0b4 indicated carry is added.

FIGURE 16 comprises a truth table which is set up to determine the magnitude and sign of the carry required by the combination of the last subtraction and the carry of the last of the regular additions or subtraction. Column 1 of this truth table represents the carry which is controlled by the state of Cr4 at To and added to Lx bit position at T1. This bit position is the second lowest since the bit from Cr4 at Tx has just been appended.

Column 2 represents the bit in Lx at To which had been copied from Cr4 by Tx trigger. This is the least significant bit of the partial product in L.

Column 3 represents the inserted into Lp from Cr3 (at Tx trigger) which is also the bit in As in Tx, being also the most significant bit of that part of the partial product which will remain in A.

Column 4 of the truth table of FIGURE 16 represents the carry as controlled by the state of 0b4 due to the last subtracation which carry is added to or subtracted from the bit in Lx at To bit time. This is the state of C2 at To.

Column 5 represents the net carry which must be inserted into this same bit position, Lx at To bit time.

Column 6 represents the state (add or subtract) of the add-subtract indicator C5 for the 1-input adder while column 7 represents the required on-time of the carry C2.

It will be noted that the carry in column 1 goes to a bit in an order which is one higher than the order of the bit position into which the carry of column 4 is added. Accordingly, the column 1 carry was a weight of 2 while the column 4 carry has a weight of 1, relative to the weight of the bit position Lx at To into which the net carry is to be added. The sum of column 1 and 4 is the net carry to be added into the bit position of the column 2 bit. Accordingly, column 5 defines the amount to be added by means of the 1 input adder to the bit position of column 2 which is in Lx at To.

It will be seen that the bit in column 3 of the truth table is the most significant bit of that portion of the partial product which remains in A. This bit is in As at Tx and is the eighth most significant bit. It is also in Lp at To, being copied from Cr3 by Tx trigger.

The truth table of FIGURE 16 sets up each possible combination of columns 1, 2, and 3 together with each of the two possible conditions of the carry of column 4. In other words, the first four columns of lines 1 and 2 of the truth table differ solely in column 4. Similarly, lines 3 and 4 differ solely in column 4 while lines 5 and 6, 7 and 8, 9 and 10, etc., are similarly paired. The fact that column 4 has only two possible conditions for each combination of columns 1, 2, and 3, may be explained as follows: A 0 in column 3 indicates that the partial product stored in A has a 0 as its most significant bit, the bit immediately to the left of the point in As at Tx, which means that the number in A is less than 1. It is known that the last operation is a subtraction during the last word time. Accordingly, the subtraction of a number less than 1 (the multiplicand) from a number which column 3 tells us is less than 1, cannot possibly yield a positive carry into the bit held by Lx at To since the worst case would be that in which a negative number of magnitude less than 1 is subtracted from a positive number which the 0 in column 3 tells us is itself less than 1. This worst case must result in a number which is less than 2 so that it could not have any effect on the bit position of weight 1 (in Lx at To, column 2). Accordingly, there can be no positive carry in column 4 if the bit in column 3 is 0. However, it is possible that the last subtraction may result in decreasing the value of the partial product so as to require a subtraction of a 1 (this is represented by the $-1$ in column 4) from the Lx position. This could occur if the multiplicand is positive when subtracting.

By similar reasoning, it can be shown that when the bit in column 3 is a 1, there is either no carry in column 4 or a positive carry, namely one which is to be added rather than subtracted.

The time interval during which the carry is to be turned on is determined not only by the net carry of column 5 but also by the state of the add-subtract indicator C5. Note that as previously set forth, the one input adder-subtractor is controlled by C5 so that addition occurs if C5 is false while subtraction occurs if C5 is true. In other words, the carry in C2 is normally turned off at the first 1 if C5 is true while the carry is normally turned off at the first 0 if C5 is false.

As a further explanation of the truth table, it will be seen with regard to line 1 thereof that the net carry of $+1$ requires that the carry be turned on early, that is, the carry must be on at To so that a carry of relative weight 1 will be added to the Lx bit position (column 2 bit). In this first line, the $+$ in column 6 indicates that C5 is false so that the carry must be turned off at the first 0 of the number to which the carry is added. This number to which we are adding the carry is, in effect, set forth in column 2 of the truth table. Since column 2 is 1 in the case under consideration, the carry must be kept on through T1 and then the logic which 0-sets C2 namely, $C5'\ Lx'\ Nc'\ Tox' + C5\ Lx\ Nc'\ Tox'$ (which starts to work at bit time T1 by virtue of the term Tox') will take over to turn off the carry in accordance with standard one input adder-subtractor operation.

Similarly with regard to line 2 of the truth table, it will be seen that a $+2$ in column 5 indicates that the carry must turn on at a relative bit position of weight 2, that is, it must be added to the Lo position at time To or in actuality, to Lx at bit time T1 when the relative bit position of 2 is in position Lx (the bit position upon which the carry logic is operative). As a consequence of the conditions indicated in line 2 of the truth table, the carry is not on at To but is on at T1 and thereafter as required. Whenever there is a carry on at T1, the logic of 0-setting C2 including the term Tox' will take over to turn the carry off.

A net carry of $+3$ in line 3 of the truth table is handled by having the carry on in relative weight positions of both 1 and 2, since in this case, as indicated by column 2, it is known that the low order carry will not propagate into higher order bits. Hence the carry is on early at To and is kept on for T1 and thereafter as required.

With regard to line 5 of the truth table, the net carry of plus 1 will augment a 0 in column 2 so that it makes no difference whether C5 is true or false. In either case the carry must be turned off immediately.

With regard to line 7 the net carry of $+1$ indicates the carry must be turned on at To and it will be kept on for T1 since C5 false indicates addition and the first bit position of the number to which we are adding (column 2) is not a 0.

Similarly the net carry of $-1$ in line 9 of the truth table will effect a diminishing by a single unit of the bit position of column 2 so that a carry cannot continue. Accordingly, the carry is on for To only.

From analysis of the truth table there is derived the logic of C2 including the first term of the 1-set side and in the several terms of the 0-set side. The second and third terms of the 1-set side of C2 are derived from a consideration of the following conditions. The bit in 0b6 at Tp is the sign bit of the multiplicand, while the corresponding bit in Cr4 at Tp is the eighth bit, the bit immediately to the left of the point of the partial product in A. Note further that the sign bit in Mn and accordingly in 0b6 is stretched so that this same sign bit appears in 0b6 for Tp and Tx. The bits from which these digits are subtracted appear in Cr4 at bit times Tp and Tx consecutively. Since the excess in A register has been removed from A and transferred into L, the bit which may be considered to appear in Cr4 during Tx time is zero. Accordingly, the last subtraction is a subtraction of subtrahend digits indicated as S S.X X X X X X X from a minuend number indicated as O X.X X X X X X where the S's indicate the stretched sign bits appearing in $0b6$ during bit times $Tp$ and $Tx$. If the multiplicand is positive, then each S is a 0 and C5 will be false at $Tx$ bit time (since the logic on C5 remains the same as previously set forth wherein C5 copies $Mn$ and does not toggle, if at all, until $Tx$ trigger). Accordingly, for purposes presently under consideration, the copying of the sign bit of $Mn$ by C5 is all that is necessary. So too, if the multiplicand is a negative number, each S is a 1 and C5 will be true at $Tx$ time.

The true state of $0b4$ at $Tx$ indicates the existence of a borrow which borrow would operate in the subtraction under consideration to change all the zeros in the minuend to the left of the first position (which is immediately to the left of the binary point) to 1's. Accordingly, the subsequent sign bit which of the multiplicand appear in $0b6$ at $Tx$ would be subtracted from 1's in view of the borrow indicated by the true condition of $0b4$. Now if C5 is true at $Tx$ time, the multiplicand is negative and all of the sign positions S of $Mn$ are 1, thus, we are in effect subtracting 1 from 1 in the additional bit positions to the left of the point whereby there is, in effect, no borrow. That is, nothing has to be propagated to the most significant half of the partial product in the L register when the multiplicand is negative (its sign bit is 1 indicated by C5 at $Tx$ time) and a carry is indicated by $0b4$ at $Tx$ time. In this condition, accordingly, C2 does not have to be 1-set despite the fact that a carry is indicated by $0b4$.

Consider next the condition indicated by $C5'\ 0b4$ where the sign positions are all zeros and a carry is indicated by $0b4$. Again, since $0b4$ indicates a borrow, the zeros in effect change to 1's from which the now zero sign bits must be subtracted. Accordingly, this borrow must be propagated and C2 is 1-set by a gate including the term $C5'\ 0b4$.

Consider the condition $C5\ 0b4'$. Since C5 is true, the sign bits are each one. There is no borrow. However, the ones of the sign bit $Mn$ which are in effect subtracted from zeros will give the same effect as a carry since it appears as if a subtraction of a −1 from 0 occurs. Accordingly, C2 must be 1-set by $C5\ 0b4'$.

Considering the condition $C5'\ 0b4'$ it is noted that the sign bits are zeros and there is no borrow. Accordingly, there is nothing to propagate and no need to 1-set the carry of the 1-input adder or subtractor C2.

SUMMARY

There has been described an improved method of multiplication which is particularly compatable with Von Neuman non-restoring division and basically operates to obtain the product of two numbers by adding or subtracting one of the numbers to itself and to successively obtained partial products in accordance with the digits of the other of the two numbers and then as a final step, subtracting the first number from the last obtained partial product. In effect this multiplication provides its operation by simultaneously carrying out two multiplications and one subtraction. The three simultaneous steps performed are, (1) the multiplication of two numbers, one number by a second number and (2) multiplying the first number by the inverse of the second number and (3) taking the difference of the two products. As a final step, the first number is subtracted from this difference to provide the desired product. In carrying forward the analogy between this multiplication and division, the serial operations are carried out starting with the most significant bit of the multiplier wherefor the most significant orders of the total product are obtained during the first steps. Thus a further advantage of this method of multiplication becomes readily apparent since the process may be stopped at any desired word time short of the total number required for a complete multiplication to still obtain the most significant portion of the product.

In the light of the choice in this method of multiplication of multiplying in accordance with the most significant digits first, the excess obtained in each successive partial product must be appended and, if necessary, added to the previously obtained bits of the higher end of the partial product. To this end improved logic is provided for rescaling the number in the register which operates to perform the additions and subtractions while transferring the excess therefrom to a second storage register. Further, novel structure is provided to combine the transfer of a carry, if any, resulting from the very last subtraction operation with the transfer of a carry, if any, resulting from the immediately previous operations in order to most expeditiously handle the operation and eliminate the requirement of an addition word time for such last carry to propagate.

The following comprises the logic for the described embodiment:

$$1Ak = Mn\ Ax\ 02'\ Tox' + Mn\ Ax'\ 02\ Tox'$$
$$0Ak = Mn'\ Ax'\ 02' + Mn'\ Ax\ 02 + Tx$$
$$1Ap = Mn\ Ax\ Ak\ Tox' + Mn\ Ax'\ Ak'\ Tox' + Mn'\ Ax\ Ak'\ Tox' + Mn'\ Ax'\ Ak\ Tox'$$
$$0Ap = Mn\ Ax\ Ak'\ Tox' + Mn\ Ax'\ Ak\ Tox' + Mn'\ Ax\ Ak\ Tox' + Mn'\ Ax'\ Ak'\ Tox' + Tx$$
$$1As = Cr3\ 0b5\ D\ Tox + Cr4\ 0b5'\ D\ Tx' + C4\ D'\ Tox'$$
$$0As = Cr3'\ 0b5\ D\ To' + Tx + Cr4'\ 0b5'\ D\ To' + C4'\ D'\ Tox'$$
$$1Ax = Ao$$
$$0Ax = Ao'$$
$$1C2 = C2'\ Cr4\ Nc'\ To + C2'\ Cr4\ Nc'\ To + C5\ 0b4'\ 0b5'\ Tx + C5'\ 0b4\ 0b5'\ Tx$$
$$0C2 = Tp + C5'\ Lx'\ Nc'\ Tox' + C5\ Lx\ Nc'\ Tox' + Cr4\ Lx'\ Lp'\ To\ C2\ D' + Cr4'\ Lx\ Lp'\ To\ C2\ D' + Cr4'\ Lx'\ Lp\ To\ C2\ D' + Cr4\ Lx\ Lp\ To\ C2\ D' + C5'\ Lx'\ Nc'\ Tox' + C5\ Lx\ Nc'\ Tox' + Tp$$
$$1C4 = Mn\ Ap\ C6'\ D\ Tox' + Mn\ Ap'\ C6\ D\ Tox' + Lp\ D'\ To'$$
$$0C4 = Mn'\ Ap'\ C6'\ D\ Tx' + Mn'\ Ap\ C6\ D\ Tx' + To + Lp'\ D'$$
$$1C5 = Mn\ D\ Ts + 02\ C5'\ Tx$$
$$0C5 = Mn'\ D\ Ts + 02\ C5\ Tx$$
$$1C6 = Cr5'\ Tx$$
$$0C6 = Cr5\ Tx$$
$$1Cr3 = Cr4\ D$$
$$0Cr3 = Cr4'\ D$$
$$1Cr4 = Mn\ Ap\ C4\ To'\ D\ Nc' + Mn\ Ap'\ C4'\ To'\ D\ Nc' + Mn'\ Ap\ C4'\ To'\ D\ Nc' + Mn'\ Ap'\ C4\ To'\ D\ Nc'$$
$$0Cr4 = Mn'\ Ap\ C4\ To'\ D + Mn\ Ap'\ C4\ To'\ D + Mn\ Ap\ C4'\ To'\ D + Mn'\ Ap'\ C4\ To'\ D + \mathrm{To}$$
$$1Cr5 = Cr6\ D$$
$$0Cr5 = Cr6'\ D$$
$$1Cr6 = Lp\ D$$
$$0Cr6 = Lp'\ D$$
$$0D = 0b5\ Tx$$
$$1Lp = Ax\ Mc'\ Txp' + Cr3\ Tx + Lx'\ C2\ Nc'\ Txp' + Lx\ C2'\ Nc'\ Txp'$$
$$0Lp = Ax'\ Mc'\ Txp' + Nc\ To + Tp + Lx\ C2\ Nc'\ Txp' + Lx'\ C2'\ Nc'\ Txp'$$
$$1Ls = Cr5\ D\ To' + Ap\ D'\ To'$$
$$0Ls = Cr5'\ D\ To' + Ap'\ D'\ To'$$
$$1Lx = Lo\ Tx' + Tp$$
$$0Lx = Lo'\ Tx'\ Tp' + Cr4'\ Nc'\ Tx$$
$$1Mc = Nd'\ Tx$$
$$0Mc = Tp$$
$$1Mn = Tp'\ Mc\ No$$
$$0Mn = Tp'\ Mc\ No'$$
$$1Nc = Nd$$
$$0Nc = Nc\ Tx$$
$$1Nd = Tp\ \text{command}$$
$$0Nd = Nd\ Tx$$

$1Np = Nx\ Top'$ $0Np = Nx'\ Top'$ $1Nx = No$ $0Nx = No'$ $002 = Nd + Cr6\ Nc'\ Tx$ $102 = Cr6\ Nc\ Tx + Cr6'\ Nc'\ Tx$ $00b5 = W4\ Tx$ $10b6 = Mn\ Tp'\ To'\ D\ 0b5'$ $00b6 = Mn'\ Tp'\ D\ 0b5 + To$

Although the invention has been described and illustrated in detail, it is to be clearly understood that the same is by way of illustration and example only and is not to be taken by way of limitation, the spirit and scope of this invention being limited only by the terms of the appended claims.

I claim:

1. In computing apparatus for automatically obtaining the product of first and second numbers, the combination comprising means for simultaneously computing the difference therefrom of the product of the first and second numbers and the product of said first number and the inverse of the second number, and means for subtracting the first number from said difference.

2. In computing apparatus for automatically obtaining the product of first and second numbers, the combination comprising means for multiplying said first number by said second number, means for obtaining the difference between the results of said multiplication and the product of said first number and the inverse of said second number simultaneously with the multiplication of said first number by said second number, and means for subtracting the first number from the least significant half of said difference.

3. Apparatus for automatically computing an integral function of the product of a multiplier and a multiplicand comprising means for registering a binary multiplicand, means for registering a binary multiplier, means for obtaining successive partial products by either adding or subtracting the multiplicand to or from each successive partial product as determined by each successive multiplying digit of the multiplier, and means for subtracting the multiplicand from the partial product.

4. Serial step by step apparatus for automatically computing a function of the product of a multiplier and a multiplicand comprising means for registering a binary multiplicand, means for registering a binary multiplier, means for obtaining two successive partial products for each step of computation by always either adding or subtracting the multiplicand to or from each of two successive partial products as determined by the digits of the multiplier, said means including means responsive to successive digits of the multiplier in successive pairs for determining whether said multiplicand is to be added or subtracted during each of two successive operations for each step of computation to produce each of the two successive partial products during each step of the computation, and means for subtracting the multiplicand from the partial product.

5. Step by step serial computing apparatus for automatically obtaining the product of a multiplicand and a multiplier comprising means for repetitively either adding or subtracting the multiplicand to or from successively obtained partial products to obtain a plurality ($m$) of such successive partial products for each step of the computation but the last, said means including indicator means responsive to successive sets of $m$ digits of the multiplier for determining whether said multiplicand is to be added or subtracted during each step of the computation but the last, means for shifting the multiplicand relative to said partial products $m$ orders for each step of the computation but the last two steps and shifting $m-1$ orders for the next to the last step, and means for subtracting said multiplicand from the last obtained partial product for the last step.

6. Step by step serial computing apparatus for automatically obtaining the product of a multiplicand and a multiplier comprising means for repetitively either adding or subtracting the multiplicand to or from each of a pair of successively obtained partial products to obtain successive pairs of successive partial products each step of the computation but the last, said means including first and second indicators respectively responsive to first and second digits of successively lower order pairs of digits of the multiplier for determining whether said multiplicand is to be added or subtracted during each step in response to said first and second digits, means for effectively shifting the multiplicand relative to the partial products two orders toward positions of lower order for each step of the computation but the last two and a single order for the next to last step, and means for subtracting said multiplicand from the last obtained partial product for the last step.

7. Serial computing apparatus for multiplying a multiplicand by a multiplier beginning with the highest order digits of the multiplier, comprising a first register having a main portion thereof for storing a number of digits equal to the number of digits of the multiplier and an extended portion at the high end thereof for storing at least one excess digit, means for initially zeroing said register and combining said multiplicand with the zeroed contents of said register to obtain a first partial product, means for repetitively shifting said partial product to higher order positions relative to said multiplicand and obtaining successive partial products by combining the multiplicand with successively obtained partial products each including a most significant digit in said extended portion of said first register, a second register, means for repetitively transferring said most significant digit of each successively obtained partial product to the digit position of lowest significance of said second register and for shifting all such transferred digits to positions of greater significance for each said combining of multiplicand and partial product, and means responsive to the sign of the multiplicand for combining with the digit of lowest significance of the previously obtained partial product a carry obtained upon such immediately previous combining.

8. Serial computing apparatus for multiplying a multiplicand by a multiplier two digits at a time beginning with the highest order digits of the multiplier comprising a first register having a main portion thereof for storing a number of digits equal to the number of digits of the multiplier and an extended portion at the high end thereof for storing two excess digits, means for initially zeroing said register and combining said multiplicand with the zeroed contents of said register to obtain a first partial product, means for repetitively shifting said partial product to higher order positions relative to said multiplicand by two orders and twice combining the multiplicand with successively obtained partial products each including a pair of most significant digits in said extended portion of said first register, a second register, means for repetitively transferring said pair of most significant digits of each sucessively obtained partial product to the two digit positions of lowest significance of said second register and for shifting all such transferred digits two orders to positions of greater significance for each two combinations of multiplicand and partial product, and means responsive to the sign of the multiplicand for combining with the digit of lowest significance of the previously obtained partial product a carry, if any, obtained upon such immediately previous combining.

9. Serial computing apparatus for multiplying a multiplicand by a multiplier beginning with the highest order digits of the multiplier comprising a first register having a main portion thereof for storing a number of digits equal to the digits of the multiplier and an extended portion at the high end thereof for storing at least one excess digit, means for initially zeroing said register and either adding or substracting said multiplicand to or from the zeroed contents of said register to obtain a first partial product in response to the most significant order digit of said multiplier, means for repetitively shifting said partial product to higher order positions relative to said multiplicand and either adding or subtracting the multiplicand to or from successively obtained partial products each including a most significant digit in said extended portion thereof, indicator means responsive to digits of successively lower significance of said multiplier for selecting either said addition or substraction, a second register, means for repetitively transferring said most significant digit of each successively obtained partial product to the digit position of lowest significance of said second register and for shifting all such transferred digits to positions of greater significance for each addition or subtraction of multiplicand and partial product, means responsive to the sign of the multiplicand and the state of the indicator means for each immediately previous addition or subtraction for adding or subtracting to the digit of lowest significance of the previously obtained partial product a carry, if any, obtained upon such immediately previous addition or subtraction, means for subtracting the multiplicand from the last obtained partial product, and means for concurrently combining with the portion of the previous partial product stored in said second register the carry, if any, obtained by said last mentioned subtraction and the carry, if any, obtained by the immediately previous addition or subtraction of multiplicand with partial product.

10. The apparatus of claim 9 wherein the carry of the subtraction from last obtained partial product is detected early by means for providing a bit by bit comparison of each bit of the multiplicand and each bit of the partial product as it is obtained.

11. In a serial binary device for multiplying a multiplicand by successively lower orders of a multiplier, a first register for storing a fixed number of lowest orders of each succesively obtained partial product, said register having a portion for storing an excess digit of each said partial product at least one order higher than the highest of said fixed number of orders, a second register for storing said multiplier and a plurality of highest order digits of successively obtained partial products, means for left shifting the contents of the first register and combining said multiplicand with such shifted contents under control of successively lower orders of said multiplier, means for successively shifting said multiplier out of said second register and simultaneously shifting said highest order digits to positions of higher order in said second register, means for appending said excess digit to the low order end of said highest order digits in said second register, and means for combining with the lowest of said highest order digits a carry, if any, obtained at the high order end of the partial product in the first register.

12. In a serial binary device for multiplying a multiplicand by successively lower orders of a multiplier and achieving such multiplication by a predetermined number of multiplier digits at a time, a first register for storing a fixed number of lowest orders of each successively obtained partial product, said register having a portion for temporarily storing a number of excess digits of said partial product successively higher than the highest of said fixed number of orders, a second register for storing said multiplier and an increasing number of highest order digits of successively obtained partial products, means for left shifting the contents of first register by a number of orders equal to said number of excess digits and combining said multiplicand with such shifted contents under control of digits of successively lower orders of said multiplier, means for successively shifting said multiplier out of said second register a number of orders at a time and simultaneously shifting said highest order digits to positions which are higher by said number of excess digits, means for appending said excess digits to the lowest order end of said highest order digits and means for combining with the lowest order digit of said highest order digits a carry, if any, obtained at the high order end of the partial product in the first register.

13. A serial binary multiplying machine comprising a first circulating register for storing a multiplicand, a second circulating register, a third circulating register for storing a multiplier, timing means for counting a predetermined number of word times each corresponding to a circulation cycle of said registers, adder-subtractor means for either adding or subtracting (according to the state of an add-subtract indicator) the contents of said first register to or from the contents of said second register and storing the result in said second register as a partial product, an add-subtract indicator having a state controlled by respective digits of the multiplier contained in the third register for selecting either adding or subtracting of said adder-subtractor means, means responsive to said timing means for causing the contents of said second and third registers to precess during all but the last word time, and means responsive to said timing means for setting said add-subtractor indicator to select subtraction during the last word time.

14. A serial binary multiplying machine comprising a first circulating register for storing a multiplicand, a second circulating register including a portion at the high order end thereof for excess and carry digits resulting from additions and subtractions performed with contents of said second register, a third circulating register for storing a multiplier, timing means for counting a predetermined number of word times each corresponding to a circulation cycle of said registers, adder-subtractor means for either adding or subtracting (as selected by an add-subtract indicator) the contents of said first register to or from the contents of said second register and storing the result in said second register as a part of a partial product once during each word time counted by said timing means, a first add-subtract indicator responsive to the highest order digit of the multiplier contained in the third register for selecting either adding or subtracting of said adder-subtractor means once during each word time as the contents of said L register are precessed to the left during each circulation cycle, means for causing the contents of said second and third registers to precess left during circulation cycles other than the last, means for inserting into the lowest order digit position of said third register the highest order digit resulting from the operation performed by said adder-subtractor means, a carry device for indicating the existence of a carry or borrow, if any, resulting from the operation of said adder-subtractor upon the highest order digits of the first and second registers, a one-input adder-subtractor responsive to the carry device for combining a carry with the digit at the low order end of said third register, a second add-subtract indicator for selecting either addition or subtraction of said one-input adder-subtractor, means for causing said second indicator to select addition if the multiplicand is negative and the previous operation was subtraction or if the multiplicand is positive and the previous operation was addition and to select subtraction if the multiplicand is negative and the previous operation was addition or if the multiplicand is positive and the previous operation was subtraction, means responsive to said timing means for setting said first add-subtract indicator to select subtraction during the last word time, means responsive to said timing means and operable during the next to the last word time for comparing the multiplicand with the last partial product obtained during the next to last word time to provide an indication of a carry resulting from the last word time subtraction, and means responsive to said comparing means and the sign of the multiplicand for additionally controlling said carry device.

15. A serial binary multiplying machine comprising a first circulating register for storing a multiplicand of $n$ digits, a second circulating register including highest and second highest order positions for excess and carry digits resulting from operations performed with contents of said second register, a third circulating register for storing a multiplier of $n$ digits, timing means for counting a predetermined number of word times each corresponding to a circulation cycle of said registers, a first logical device for sequentially combining the digits circulated out of the low end of said first register with the digits circulated out of the low end of said second register during each cycle sequentially storing resulting digits in said highest order position of said second register as parts of a partial product, a second logical device for sequentially combining the digits at the low end of said first register with said resulting digits sequentially stored in said highest order position of said second register and storing the final result in said second register as a part of a partial product, means for causing the contents of said second and third registers to precess left by two digit positions during $n/2-1$ circulation cycles and causing a single digit position precession of said second register during the following cycle, means for inserting into the two lowest order digit positions of said third register the two highest order partial product digits resulting from the operations performed by said second logical device, a carry device for indicating the existence of a carry, if any, resulting from the operation of said second logical device upon the highest order digits of the first and second registers, and means responsive to the carry device for combining a carry with the digit at the low order end of said third register.

16. A serial binary multiplying machine comprising a first circulating register for storing a multiplicand, a second circulating register including highest and second highest order positions for excess sum and difference and carry digits resulting from additions and subtractions performed with contents of said first and second registers, a third circulating register for storing a multiplier, timing means for counting a predetermined number of word times each corresponding to a circulation cycle of said registers, a first adder-subtractor for either adding or subtracting (under control of a first add-subtract indicator) the digits circulated through said first register to or from the digits circulated through said second register and storing the resulting sum or difference digits in said highest order position of said second register as a part of a partial product, a second adder-subtractor for either adding or subtracting (under control of a second add-subtract indicator) the digits circulated through said first register to or from the sum or difference digits stored in said highest order position of said second register and storing the result in said second highest order position of said second register as a part of a partial product, a first add-subtract indicator responsive to the highest order digit of the multiplier contained in the third register for selecting either adding or subtracting of said first adder-subtractor, a second add-subtract indicator responsive to the second highest order digit of the multiplier contained in the third register for selecting either adding or subtracting of said second adder-subtractor, means responsive to said timing means for causing the contents of said second and third registers to precess left by two digit positions during each word time other than the last two and for causing a single digit position precession of said second register during the next to the last cycle, means for inserting into the two lowest order digit positions of said third register the two highest order digits resulting from the operations performed by said second adder-subtractor, a carry device for indicating the existence of a carry, if any, resulting from the operation of said second adder-subtractor upon the highest order digits of the first and second registers, a one-input adder-subtractor responsive to the carry device for combining a carry with the digit at the low order end of said third register, a third add-subtract indicator for selecting either addition or subtraction of said one-input adder-subtractor, means for causing said third indicator to select addition if the multiplicand is negative and the more significant of the two previous operations was subtraction or if the multiplicand is positive and the more significant of the two previous operations was addition or to select subtraction if the multiplicand is negative and the more signficant of the two previous operations was addition or if the multiplicand is positive and the more significant of the two previous operations was subtraction, means for setting said first add-subtract indicator to select subtraction during the last word time, means operable during the next to the last word time for comparing the multiplicand with the last partial product obtained during the next to last word time to provide an indication of a carry resulting from the last word time subtraction, and means responsive to said comparing means and the sign of the multiplicand for additionally controlling said carry device.

References Cited by the Examiner

UNITED STATES PATENTS

| | | | |
|---|---|---|---|
| 2,590,599 | 3/1952 | Evans | 235—164 |
| 2,914,248 | 11/1959 | Ross et al. | 235—157 |
| 3,116,411 | 12/1963 | Keir | 235—164 |
| 3,167,646 | 1/1965 | Giroux | 235—167 |

ROBERT C. BAILEY, *Primary Examiner.*

DARYL W. COOK, MALCOLM A. MORRISON, *Examiners.*